United States Patent
Smith et al.

(10) Patent No.: US 9,098,365 B2
(45) Date of Patent: Aug. 4, 2015

(54) SYSTEM, METHOD AND COMPUTER PROGRAM PRODUCT FOR CONDITIONALLY ENABLING AN INSTALLATION ASPECT

(75) Inventors: Andrew Smith, San Francisco, CA (US); Craig Weissman, San Francisco, CA (US); Danil Dvinov, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 376 days.

(21) Appl. No.: 12/903,381

(22) Filed: Oct. 13, 2010

(65) Prior Publication Data

US 2011/0231835 A1  Sep. 22, 2011

Related U.S. Application Data

(60) Provisional application No. 61/314,518, filed on Mar. 16, 2010.

(51) Int. Cl.
*G06F 9/445* (2006.01)
*G06F 21/52* (2013.01)

(52) U.S. Cl.
CPC ........ *G06F 8/61* (2013.01); *G06F 21/52* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu et al. | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,014,666 A * | 1/2000 | Helland et al. | 1/1 |
| 6,092,083 A | 7/2000 | Brodersen et al. | |
| 6,161,149 A | 12/2000 | Achacoso et al. | |
| 6,163,878 A * | 12/2000 | Kohl | 717/100 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

OTHER PUBLICATIONS

Aulbach et al., "Multi-Tenant Databases for Software as a Service: Schema-Mapping Techniques," Copyright 2008, ACM.*

(Continued)

*Primary Examiner* — Insun Kang
(74) *Attorney, Agent, or Firm* — Zilka-Kotab, PC

(57) ABSTRACT

In accordance with embodiments, there are provided mechanisms and methods for conditionally enabling an installation aspect. In one embodiment, code to be installed within a multi-tenant on-demand database system is identified. Additionally, a feature required to install the code is identified, where the feature includes data that is required to be accessed by the code when the code is installed and run within the multi-tenant on-demand database system. Further, the feature is conditionally enabled, based on one or more criteria.

18 Claims, 26 Drawing Sheets

(56) References Cited

U.S. PATENT DOCUMENTS

| | | | |
|---|---|---|---|
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,140,576 B1 * | 3/2012 | Viripaeff et al. | 707/781 |
| 8,275,936 B1 | 9/2012 | Haywood et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0003266 A1 * | 1/2004 | Moshir et al. | 713/191 |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0230571 A1 * | 11/2004 | Robertson | 707/3 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0120106 A1 * | 6/2005 | Albertao | 709/223 |
| 2005/0131814 A1 * | 6/2005 | Jakstadt et al. | 705/39 |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2007/0088741 A1 * | 4/2007 | Brooks et al. | 707/103 R |
| 2008/0010233 A1 * | 1/2008 | Sack et al. | 707/1 |
| 2008/0201701 A1 * | 8/2008 | Hofhansl et al. | 717/168 |
| 2008/0249972 A1 | 10/2008 | Dillon | |
| 2008/0270987 A1 * | 10/2008 | Weissman | 717/124 |
| 2009/0049065 A1 * | 2/2009 | Weissman | 707/100 |
| 2009/0049102 A1 * | 2/2009 | Weissman | 707/104.1 |
| 2009/0063415 A1 | 3/2009 | Chatfield et al. | |
| 2009/0089407 A1 * | 4/2009 | Chalupa et al. | 709/220 |
| 2009/0100342 A1 | 4/2009 | Jakobson | |
| 2009/0177744 A1 | 7/2009 | Marlow et al. | |
| 2009/0276477 A1 * | 11/2009 | Thuringer et al. | 707/205 |
| 2009/0288084 A1 * | 11/2009 | Astete et al. | 718/1 |
| 2009/0320035 A1 * | 12/2009 | Ahlgren et al. | 718/104 |
| 2010/0017415 A1 * | 1/2010 | Kurumai et al. | 707/10 |
| 2010/0138830 A1 * | 6/2010 | Astete et al. | 718/1 |
| 2010/0299664 A1 | 11/2010 | Taylor et al. | |
| 2011/0126168 A1 * | 5/2011 | Ilyayev | 717/103 |
| 2013/0218948 A1 | 8/2013 | Jakobson | |
| 2013/0218949 A1 | 8/2013 | Jakobson | |
| 2013/0218966 A1 | 8/2013 | Jakobson | |

OTHER PUBLICATIONS

Chong et al., "Multi-Tenant Data Architecture ," Microsoft, Jun. 2006.*

U.S. Appl. No. 60/828,192, filed Oct. 4, 2006.

Salesforce, "How to be Successful with Salesforce," User Guide: Winter '11, Sep. 27, 2010, pp. 1-2902.

* cited by examiner

SYSTEM, METHOD AND COMPUTER PROGRAM PRODUCT FOR CONDITIONALLY ENABLING AN INSTALLATION ASPECT

CLAIM OF PRIORITY

This application claims the benefit of U.S. Provisional Patent Application No. 61/314,518, entitled "Package Access Control," by Weissman et al., filed Mar. 16, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to installing code, and more particularly to regulating access of code to be installed.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional code distribution systems, code created by a developer is distributed to one or more users. For example, a provider may distribute developer-created code to one or more users of the code. Unfortunately, conventional code distribution systems have been associated with various limitations.

Just by way of example, traditional methods of distributing code to a user and installing such code have used static access criteria. Additionally, such methods of distributing code fail to coordinate with users of the code with respect to the access boundaries of such code. Accordingly, it is desirable to provide techniques that increase the flexibility and communication involved with code distribution.

BRIEF SUMMARY

In accordance with embodiments, there are provided mechanisms and methods for conditionally enabling an installation aspect. These mechanisms and methods for conditionally enabling an installation aspect can enable an improved determination of boundaries associated with the code, improved communication between code developers and users, improved security and access restriction, etc.

In an embodiment and by way of example, a method for conditionally enabling an installation aspect is provided. In one embodiment, code to be installed within a multi-tenant on-demand database system is identified. Additionally, an aspect required with respect to the code is identified. Further, the aspect is conditionally enabled, based on one or more criteria.

While one or more implementations and techniques are described with reference to an embodiment in which enabling an installation aspect is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for conditionally enabling an installation aspect.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for conditionally enabling an installation aspect will be described with reference to example embodiments.

Figure 1:
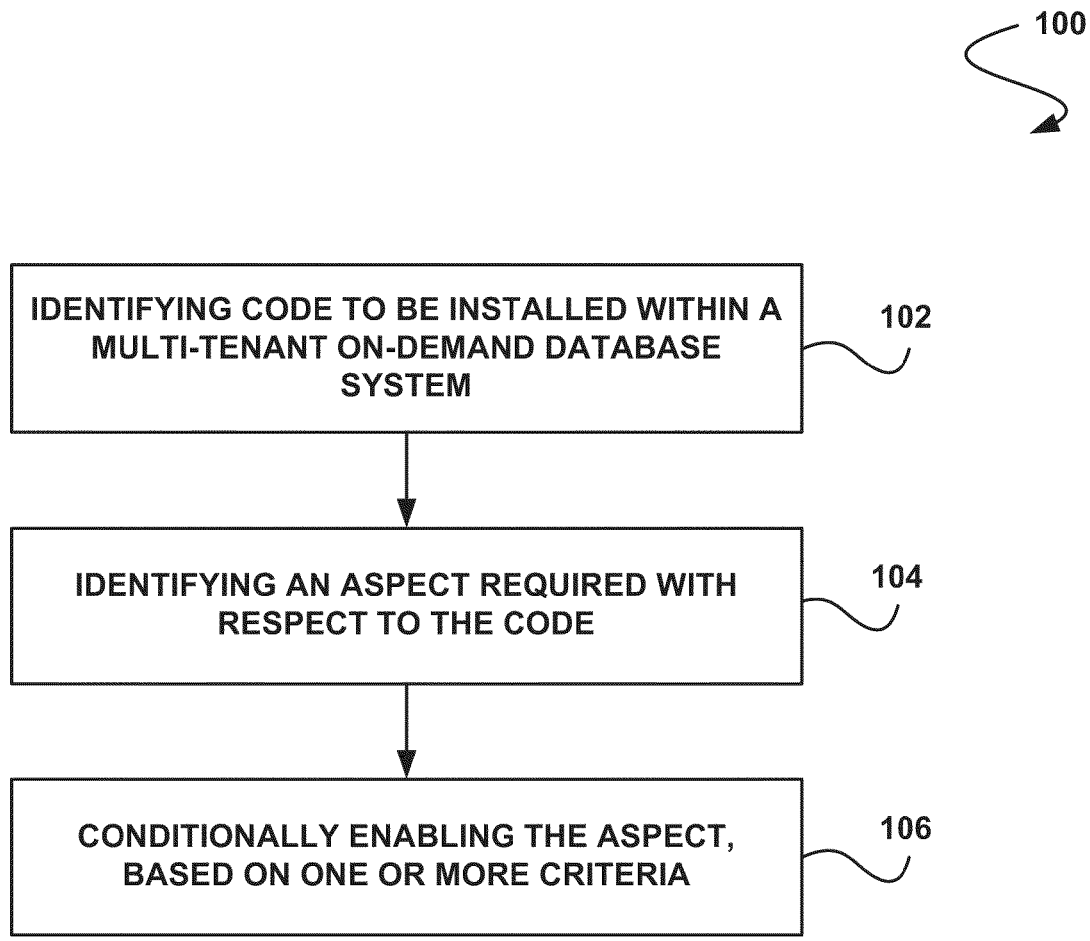
FIG. 1 illustrates a method for conditionally enabling an installation aspect, in accordance with one embodiment.

FIG. 1 illustrates a method 100 for conditionally enabling an installation aspect, in accordance with one embodiment. As shown in operation 102, code to be installed within a multi-tenant on-demand database system is identified. With respect to the present description, the code may include any data (e.g., one or more files, etc.) that is capable of being installed within the multi-tenant on-demand database system. For example, the code may include an application. In another example, the code may include an update to a currently installed application. In yet another example, the code may include a package (e.g., comprising one or more files, programs, etc.).

In another embodiment, the code may be associated with a platform of the multi-tenant on-demand database system. For example, the code may be drafted in a programming language associated with the multi-tenant on-demand database system. In another example, the code may be drafted in order to integrate with the platform of the multi-tenant on-demand database system.

Additionally, in one embodiment, the code may be drafted by an entity associated with the multi-tenant on-demand database system. For example, the code may be drafted by a partner of the multi-tenant on-demand database system, a developer associated with the multi-tenant on-demand database system, etc. Further, in another embodiment, the code may provide a service in association with the multi-tenant on-demand database system. In another embodiment, the code may include an enhancement of a service provided by the multi-tenant on-demand database system.

It should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Additionally, as shown in operation 104, an aspect required with respect to the code is identified. In one embodiment, the aspect may include data that is required to be accessed by the code when the code is installed and run within the multi-tenant on-demand database system. For example, the aspect may include accessing data within the multi-tenant on-demand database system (e.g., within a database of the multi-tenant on-demand database system, a table in the database, etc.) by the code when the code is installed and run. In another example, the aspect may include accessing data and/or communicating data outside of the multi-tenant on-demand database system (e.g., external network data, external databases, third party services, etc.) by the code when the code is installed and run.

Additionally, in another embodiment, the aspect may include operations that are performed on data that is accessed by the code when the code is installed and run (e.g., within the multi-tenant on-demand database system, etc.). For example, the aspect may include whether data is created by the code within the multi-tenant on-demand database system. In another example, the aspect may include whether data accessed by the code (e.g., data within the multi-tenant on-demand database system, outside the multi-tenant on-demand database system, etc.) is read by the code, updated (e.g. written to, etc.) by the code, deleted by the code, sent by the code (e.g., to an external network source, etc.), etc.

Further, in still another embodiment, the aspect may include one or more methods of accessing data that are required by the code (e.g., when the code is installed and run on the multi-tenant on-demand database system, etc.). For example, the aspect may include whether an element of the multi-tenant on-demand database system (e.g., an associated database, etc.) is accessed utilizing a programming language associated with the multi-tenant on-demand database system. In another example, the aspect may include whether the element of the multi-tenant on-demand database system is accessed utilizing a particular application programming language (API) (e.g., a web services API, etc.). Additionally, in another embodiment, the aspect may include one or more references from one or more components that are created declaratively (e.g., one or more workflow rules, etc.).

Further still, in one embodiment, the aspect may be identified by analyzing the code. For example, the code may be statically introspected in order to determine what data is being accessed by the code and how such access is occurring. In another embodiment, the aspect may be identified by a provider of the multi-tenant on-demand database system. For example, the aspect may be identified by a provider of the multi-tenant on-demand database system when the code is submitted to the multi-tenant on-demand database system, when the code is developed in association with the multi-tenant on-demand database system, etc.

In yet another embodiment, the identified aspect may be presented to an entity associated with the code. For example, the identified aspect may be presented to a developer of the code (e.g., when the developer submits the code to the multi-tenant on-demand database system, distributes the code through the multi-tenant on-demand database system, etc. Additionally, in one embodiment, the developer may elaborate upon the identified aspect in response to the presentation. For example, the developer may provide a motivation behind the aspect, a reason for the aspect, etc.

Further, in one embodiment, the aspect required with respect to the code may be extended, based on the identifying. For example, a provider of the multi-tenant on-demand database system may add or extend access to data models of the multi-tenant on-demand database system (e.g., databases, tables in databases, etc.) that may be accessed by the code in addition to data models already accessed by the code according the aspect. In this way, the code may access resources of the multi-tenant on-demand database system that the developer of the code may not have been aware of.

Further, as shown in operation 106, the aspect is conditionally enabled, based on one or more criteria. In one embodiment, enabling the aspect may include allowing the code to access particular data within the multi-tenant on-demand database system, outside of the multi-tenant on-demand database system, etc. In another embodiment, enabling the aspect may include allowing the code to perform one or more operations on data within the multi-tenant on-demand database system, outside of the multi-tenant on-demand database system, etc. In yet another embodiment, enabling the aspect may include allowing one or more methods of accessing data by the code. In still another embodiment, enabling the aspect may include installing the code within the multi-tenant on-demand database system.

Additionally, in one embodiment, a user (e.g., a subscriber of the multi-tenant on-demand database system, etc.) may be presented with the aspect required with respect to the code. For example, the user may be presented with a notice associated with the aspect (e.g., via a graphical user interface (GUI), an electronic mail message, etc.) in response to the user attempting to install the code within the multi-tenant on-demand database system. In one embodiment, the notice may include an indication that the aspect required with respect to the code needs to be approved by the user.

Additionally, input from the user in response to the presentation of the aspect to the user may be received (e.g., via a keyboard, touch screen, voice command, etc.). Further, the aspect may be conditionally enabled, based on the input from the user. For example, the aspect may be disabled if the user indicates that the aspect required with respect to the code is not desired. In another example, the aspect may be enabled if the user indicates that the aspect required with respect to the code is acceptable.

In another embodiment, one or more rules associated with enabling the aspect may be generated (e.g., by a user, etc.). For example, the rules may indicate one or more aspects of the code that are determined to be allowable by the user. In another example, the rules may indicate one or more entities associated with the code that are determined to be trusted by the user (e.g., a trusted developer, etc.). Additionally, the aspect may be conditionally enabled, based on the one or more rules. For example, the aspect may be compared against the rules (e.g., in response to the user attempting to install the code within the multi-tenant on-demand database system), and if one or more of the rules are met by the aspect, then the aspect may be enabled. However, if one or more of the rules are not met by the aspect, then the aspect may be disabled.

In another example, the code and/or an entity associated with the code may be compared against the rules, and if one or more of the rules are met by the code and/or the entity associated with the code, then the aspect may be enabled. However, if one or more of the rules are not met by the code and/or the entity associated with the code, then the aspect may be disabled.

Further, in one embodiment, the aspect required with respect to the code may be extended, based on one or more elements associated with the user. For example, the user may add or extend access to data models of the user (e.g., databases, tables in databases, etc.) that may be accessed by the code in addition to data models already accessed by the code according the aspect. In this way, the code may access resources of the user that the developer of the code may not have been aware of.

Figure 2:
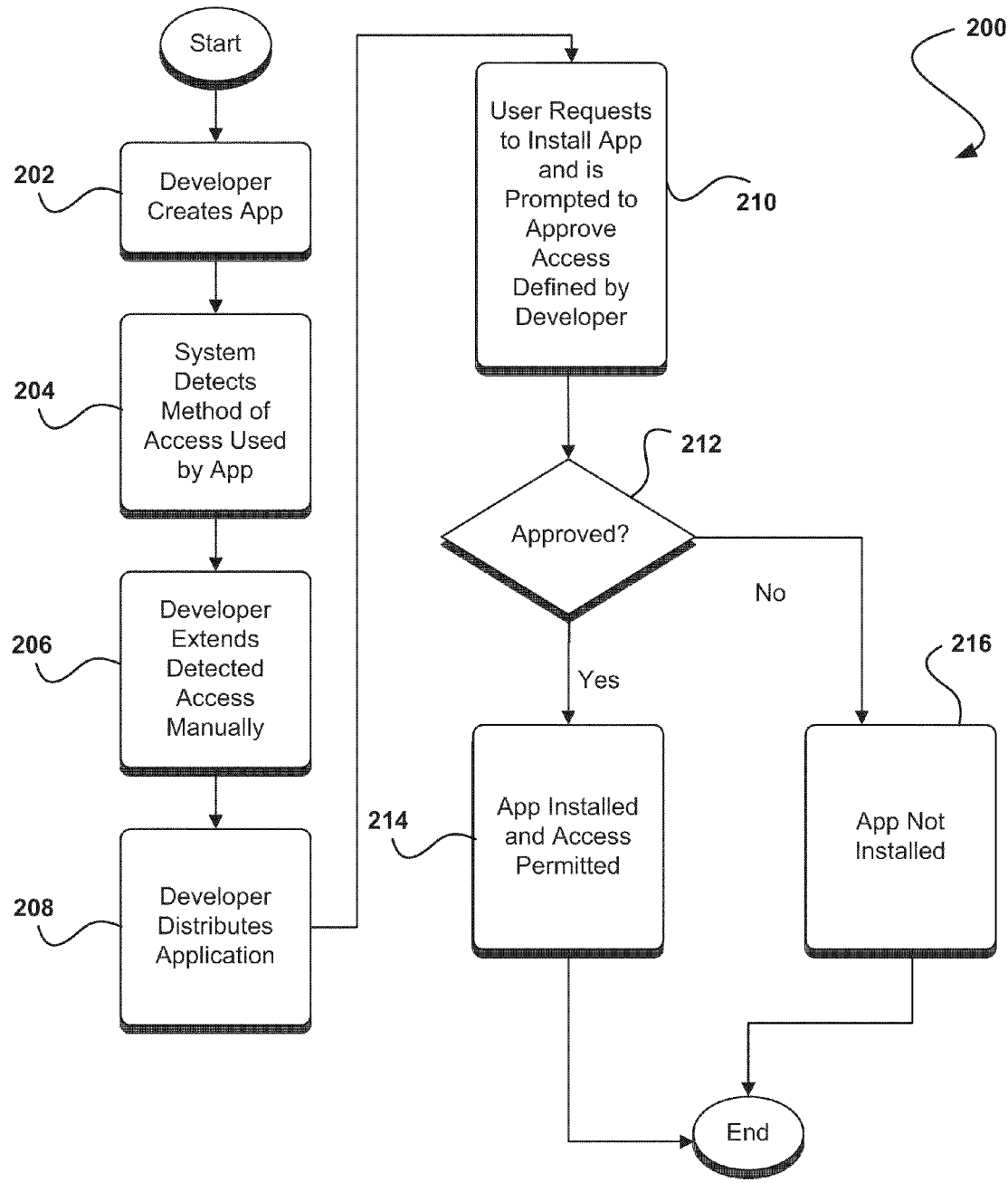
FIG. 2 illustrates a method for controlling application access, in accordance with another embodiment.

FIG. 2 illustrates a method 200 for controlling application access, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a developer creates an application to be installed within a multi-tenant on-demand database system. In one embodiment, the application may access one or more data elements inside or outside the multi-tenant on-demand database system. In another embodiment, the application may perform one or more actions on the data elements (e.g., creating, reading, updating, deleting, etc.). Further, the application may access the one or more data elements through one or more methods of access (e.g., through a database programming language, an application programming interface (API), etc.).

Additionally, as shown in operation 204, a system detects a method of access used by the application. In one embodiment, the system may be associated with the multi-tenant on-demand database system. For example, the system may include an application development component of the multi-tenant on-demand database system. In another embodiment, the system may detect the method of access by analyzing the application. For example, the system may perform static introspection on the application code in order to determine what elements in the multi-tenant on-demand database system (e.g., one or more database tables, etc.) are being accessed by the application. In yet another embodiment, the system may detect one or more data elements accessed by the application, one or more actions performed on the data elements, etc.

Further, in one embodiment, the system may inform the developer of necessary access associated with the application, based on the detection. For example, the system may notify the developer that the application needs to access one or more elements in the multi-tenant on-demand database system. In this way, the developer may be notified of all elements for which access needs to be granted in order to install the application.

Further still, as shown in operation 206, the developer extends detected access manually. For example, in response to a notification that the application needs to access one or more elements inside or outside of the multi-tenant on-demand database system, the developer may extend access to those elements manually.

Also, as shown in operation 208, the developer distributes the application. In one embodiment, the developer may distribute the application by submitting it to a provider for distribution. For example, the developer may distribute the application by submitting it to the multi-tenant on-demand database system for distribution to one or more users, subscribers, etc.

In addition, as shown in operation 210, a user requests to install the application and is prompted to approve access defined by the developer. In one embodiment, the user may request to install the application within the multi-tenant on-demand database system provided to the user. In another embodiment, the prompt to approve access may include a visual prompt (e.g., a pop-up screen, a warning page, etc.), an audio prompt, etc.

Furthermore, as shown in decision 212, it is determined whether the user approves the access defined by the developer. If in decision 212 it is determined that the user does approve of the access defined by the developer, then in operation 214 the application is installed and the access defined by the developer is permitted. For example, the application may be installed within the multi-tenant on-demand database system, and the application may be given access to one or more data elements inside or outside the multi-tenant on-demand database system, as defined by the developer.

However, if in decision 212 it is determined that the user does not approve of the access defined by the developer, then in operation 216 the application is not installed (e.g., within the multi-tenant on-demand database system, etc.). In this way, the application may be contained by the user so that the application may not performed one or more actions not authorized by the user (e.g., transmitting information associated with the user outside of the multi-tenant on-demand database system, accessing and/or altering sensitive data within the multi-tenant on-demand database system, interfering with other applications within the multi-tenant on-demand database system, etc.).

Additionally, see, for example, "How to be Successful with Salesforce," (Sep. 27, 2010), which is hereby incorporated by reference in its entirety, and which describes exemplary methods of package access control.

In one embodiment, the method 200 for controlling application access may be associated with package access control (PAC) of the multi-tenant on-demand database system. For example, an aspect (or PAC feature) may scope and control what objects a partner's package can access in a subscriber's org. The feature covers access via workflow, Apex, API, and the metadata API. In addition, the feature may alert subscribers to packages that are using technologies in which access cannot be controlled. In another embodiment, dynamic apex and extension packages may be supported. In addition, for an iteration, PAC may only be supported at the object level—not field.

Additionally, in another embodiment, one or more exemplary use cases may be provided. For example, a subscriber may want to use a partner application that extends the accounts and contacts objects of a CRM application. The partner application uses a session ID to make updates via an API. The subscriber may not want this session ID to be used to retrieve opportunity data—down to the field level. In another example, partners may want to access subscriber added fields to their managed-installed objects through dynamic apex. In yet another example, partners may want to access subscriber added fields to standard objects through dynamic apex. In still another example, partners may want to access all objects and fields in the org using dynamic apex. For instance, if you were building a find and replace tool or some sort admin. tool that would be applicable to any object.

In order to better protect customers, PAC may optionally now always be enabled for managed packages. It may never be an option to disable it.

In yet another embodiment, PAC spidering and object selection may occur. We may make a basic assumption that a partner should always have full CRUD access to the data contained in the objects in their package. No warnings or approval may be required on install in this case. If the customer does not 'trust' the partner app, then don't install it.

We may automatically detect static references to objects not included in the package (standard and extension) and force enable access to these objects in PAC using the appropriate CRUD setting. The partner and subscriber cannot disable these settings. For this area, we may check the following components: Table 1 illustrates one example of components that may be checked in accordance with PAC. Of course, it should be noted that the components shown in Table 1 is set forth for illustrative purposes only, and thus should not be construed as limiting in any manner.

TABLE 1

Workflow outbound messaging
    Would enable "Read"
Apex email alert
    Would enable "Read"
    Enforced at runtime as cannot be detected
Workflow email alerts
    Would enable "Read"
Workflow field updates
    Would enable "Read" and "Update"
Apex
    Referencing will enable "Read"
        Account a = new Account( );
    DML action will enable "CUD" as appropriate.

TABLE 1-continued

VF
    Using standard controller with enable "CRUD"
    Additionally, in one embodiment, components may only be covered that can modify data or transfer data outside of a multi-tenant on-demand database system. We may not detect components that can only consume data such as reports, formula fields, etc.

In another embodiment, when create, read, update, and delete (CRUD) functionality is selected, we may mimic the UI logic used on the profile page for selecting related CRUD (e.g., Select "C," also enabled "R"; Select "E," also enabled "R"; Select "D," also enabled "RE"; etc.). Additionally, removing a selection may remove the dependent CRUD options too.

Further, in one embodiment, the developer may enable access to additional platform objects, standard CRM objects, or base package objects. Note the developer may not select local custom objects. Subscribers may not be allowed to disable these references. Further still, the subscriber may enable PAC on the same entities the developer can control. In addition, the subscriber may enable PAC on any object in their org—even local custom objects or objects in other packages unrelated to the partner's package.

Also, in one embodiment, development with PAC may be provided. For example, when a component is added to a package, instantly the package's PAC settings may be enforced on the component. PAC may never be used to introduce a dep on or spider an object into a package. While typically this shouldn't occur, in the event that a package is installed and PAC is specified on a standard object that does not exist in the subscriber, we should install the PAC record, but hide it in the UI. If later the subscriber upgrades/enables a feature that exposes that object then the PAC row should become visible and apply.

Further, at runtime and when running apex tests, if the dev attempts to reference an object where PAC is not enabled, we may throw an exception with specific details on how to resolve the problem. This case could occur when an object in a base package or a platform object is references via the API or dynamic Apex. Additionally, the cache may be invalidated when making changes to PAC or adding/removing components from a package.

In addition, in one embodiment, since PAC may be enabled on ALL managed packages and legacy unmanaged packages, we may need a way to handle packages that contain insecure components such as scontrols. For example, if a package includes an s-control, the dev. may not be allowed to enable PAC settings. Subscribers may enable PAC in this scenario. In reverse, if PAC is enabled on the package in the dev org then the dev may not add scontrols to the package. Since scontrols are insecure, the thought was we were calling this out by not allowing you to set PAC with them included.

Further, as an option, the developer may be allowed to include insecure components in any package with PAC enabled. Inclusion may cause a security warning to appear on the dev package, during install time, and on the package in the subscriber's org. The basic idea is that these insecure components may not be covered by package security. This feature may apply to managed packages only.

Table 2 illustrates exemplary insecure components. Of course, it should be noted that the components shown in Table 2 is set forth for illustrative purposes only, and thus should not be construed as limiting in any manner.

TABLE 2

S-Controls (all)
HTML homepage components
Buttons/links:
    All the ones of type 'onclick javascript' will be flagged
    We'll add a check to see if the URL variation starts with
    "javascript:". If so, we'll flag this variety.
    We won't list the ones using an scontrol as the scontrol will
    already be flagged.
Homepage custom links
    a check may be added to see if the URL variation starts with
    "javascript:". If so, this variety may be flagged.

In yet another embodiment, one or more objects may not be covered by PAC. Some of these may be considered platform objects, such as user. Others represent metadata, like scontrol. Some arbitrary decisions may be made around which objects you gain access to from this set when PAC is enabled.

In still another embodiment, access to platform objects may not be implicitly offered. They may be treated as any other object that can be controlled by PAC. References may be detected and automatically included.

In one embodiment, a PAC session ID may be used to access the metadata API (mdAPI). By default, a PAC session ID may not be allowed to call the metadata API. In another embodiment, no PAC session IDs may be allowed to call the mdAPI. Additionally, we may now offer a new way for a partner to use the mdAPI with a PAC session ID. In PAC, a partner may enable mdAPI access. This may apply to the entire org—not scoped to the package. If partner enables, then subscriber cannot disable. The subscriber may also enable just like with CRUD PAC.

Table 4 illustrates calls that a partner may perform when mdAPI access is enabled for an object. Of course, it should be noted that the calls shown in Table 4 is set forth for illustrative purposes only, and thus should not be construed as limiting in any manner.

TABLE 4 checkStatus( )
create( )
delete( )
update( )
deploy( )
retrieve( )
describeMetadata( )
listMetadata( )

Further, in one embodiment, in the future we may find holes in PAC and want to patch them. For some holes, we may be able to easily enforce them on subscriber orgs. For others, we might only be able to enforce them in the dev org and then have to wait for a package upgrade to occur for the change to be implemented on subscriber orgs. For instance, we might not be able to enforce PAC on workflow emails and apex emails this release. If we want to add these, then we may need to only make this change in the dev org and wait for an upgrade to occur to enforce in sub orgs.

Further still, in another embodiment, in a package.xml file found in the IDE, a list may be maintained of the package members, the package's PAC setting, and a list of the CRUD settings for each object where PAC can be specified. The presents of the <apiAccessLevel> tag may determine whether the package is using new PAC or old PAC. If the <apiAccessLevel> tag isn't present, but the package is managed and includes <objectPermissions> tags, then we may assume that package uses new PAC? So basically, on one embodiment, no new package uploads should include a <apiAccessLevel> tag.

Table 6 illustrates code for adding a new tag with new PAC to house the comments associated with an entity. Of course, it should be noted that the code shown in Table 6 is set forth for illustrative purposes only, and thus should not be construed as limiting in any manner.

TABLE 6

```
<objectPermissions>
        <allowRead>true</allowRead>
        <object>Account</object>
        <comment>I need this.</comment>
</objectPermissions>
Example:
<?xml version="1.0" encoding="UTF-8"?>
<Package xmlns="http://soap.sforce.com/2006/04/metadata">
    <fullName>My New Package</fullName>
    <apiAccessLevel>Restricted</apiAccessLevel>
    <namespacePrefix>asdfas</namespacePrefix>
    <objectPermissions>
        <allowRead>true</allowRead>
        <object>Account</object>
    </objectPermissions>
    <objectPermissions>
        <object>Asset</object>
    </objectPermissions>
    <objectPermissions>
        <object>Campaign</object>
    </objectPermissions>
    <objectPermissions>
        <allowCreate>true</allowCreate>
        <allowRead>true</allowRead>
        <object>Case</object>
    </objectPermissions>
    <objectPermissions>
        <object>Contact</object>
    </objectPermissions>
    <objectPermissions>
        <allowCreate>true</allowCreate>
        <allowRead>true</allowRead>
        <object>Contract</object>
    </objectPermissions>
    <objectPermissions>
        <object>Document</object>
    </objectPermissions>
    <objectPermissions>
        <object>Idea</object>
    </objectPermissions>
    <objectPermissions>
        <allowCreate>true</allowCreate>
        <allowRead>true</allowRead>
        <object>Lead</object>
    </objectPermissions>
    <objectPermissions>
        <object>Opportunity</object>
    </objectPermissions>
    <objectPermissions>
        <object>Pricebook2</object>
    </objectPermissions>
    <objectPermissions>
        <allowEdit>true</allowEdit>
        <allowRead>true</allowRead>
        <object>Product2</object>
    </objectPermissions>
    <objectPermissions>
        <allowCreate>true</allowCreate>
        <allowDelete>true</allowDelete>
        <allowEdit>true</allowEdit>
        <allowRead>true</allowRead>
        <object>Solution</object>
    </objectPermissions>
    <types>
        <members>foo</members>
        <name>ApexClass</name>
    </types>
    <version>14.0</version>
</Package>
```

In another embodiment, one or more rules may be provided for inferring full CRUD associate entity access when the parent is enabled for Read. Most would rather see a 1-1 CRUD mapping of associate entity access to parent. An example associate entity is Account_Share and the parent is Account. In this case, enabling "RE" on Account would only enable "RE" on all associate entities like Account_Share.

In still another embodiment, a user may be a somewhat special entity in that almost every UI page displays some piece of data from that entity. We may want to track PAC on user; however, if only read access is enabled on user and that is the only entity with PAC enabled, then we may skip showing the PAC warning during package install. We may not want the PAC warning appearing on every package install, which would likely occur if we checked user.

Additionally, in one embodiment, we may have a mechanism to alert an installer that a partner's package is composite and talks to an external service. This could be as simple as a web link to points to a non-SFDC domain, callouts in Apex, etc. We may address this problem today by detecting the domain used in custom buttons/links and listing those domains during install next to the component.

In another embodiment, another way to come at this problem may be to use the remote settings and trusted IP ranges to alert installers. Callouts, Outbound messaging, Web links (e.g., external, etc.), External links (VF page), Buttons/links with JS, Page saves via button/link, Email services may all be included.

Further, in one embodiment, push upgrades may be provided. For example, on initial install, the subscriber may be asked to approve the extension package's access to the declared base package objects. In the case of push upgrades, we may not simply auto enable PAC. We may have the admin approve the PAC. In one embodiment, two options are available: (1) Block the push until the admin has approved PAC. If they never approve it, then the push will never complete. Additionally, see, for example, U.S. patent application Ser. No. 12/784,666, Attorney Docket Number SFC1P055/093US, filed May 21, 2010, which is hereby incorporated by reference in its entirety, and which describes exemplary application update pushing.

The other option is (2) Allow the push to proceed. Block operation of certain functions until PAC is approved by the admin. Give devs a way to determine if PAC was approved. In one embodiment, partners may choose between the two options. In another embodiment, if we go with option #2 for the upgrade, then we may use CRUC as a way for partners to request access from admins. They may either have to accept or decline the access in CRUC.

Further still, in one embodiment, a package developer may have to have ways to code for the various cases when they haven't been granted access. They may also need a way to test for this. For example, with respect to workflow outbound messaging, two options may exist—Option 1, where messages may not be sent until the access is added (It basically would be skipped over), and Option 2, which may require that workflow OM on an object where PAC is new be added to a new workflow rule. Then that rule may be enabled post install. Block enabling the rule if it includes actions where PAC is not authorized.

Also, in another embodiment, with respect to apex email alerts, an exception may be thrown when an email using a template for an object where PAC is not enabled tries to be sent. In yet another embodiment, two options may be provided with respect to workflow email alerts and workflow field updates. In one option, emails may not be sent until the access is added. It basically would be skipped over. In another option, it may be required that workflow OM on an object where PAC is new be added to a new workflow rule. Then that rule must be enabled post install. Block enabling the rule if it includes actions where PAC is not authorized.

Additionally, in one embodiment, a runtime exception may be thrown in apex when Accessing trigger.*, Returning SOQL/SOSL, DML on object, etc. In another embodiment, a test may be performed with PAC enabled vs. Disabled. In yet another embodiment, it may be determined whether PAC is enabled or disabled. Additionally, a hook may be used for sending user to page to update PAC and a returnURL to redirect them back. Additionally, it may be determined if a user is authorized to update PAC. Further, with respect to VF, a redirect may exist to a page that says no access if using standard controller (may include a link to PAC, etc.).

Further, in one embodiment, PAC may be made easier to use and understand for both developers and subscribers. PAC settings may become more transparent, and both developers and subscribers will receive appropriate security warnings for packages containing insecure components. This feature may steer developers away from including insecure components in their packages as well as encourage development of managed packages, while further asserting an unmanaged package as a template-like mechanism for passing data between orgs.

In the embodiment below, "PAC settings" may be thought of as PAC CRUD permissions and Metadata API access for an entity. In a first step, a developer of a managed package may specify PAC on objects in the package. These may exclude custom entities in developer org not included in the package. Entities not included in the package but referenced by certain components (see section 3) may have PAC settings configured automatically.

In a second step, at package installation time, the subscriber may be presented with the PAC settings defined by developer, along with the explanation as to why a particular entity has a particular set of permissions. In a third step, having installed the package, a subscriber may specify PAC settings on additional objects. These can include any entities available in the subscriber org. Settings specified by the developer may not be edited or removed.

In one embodiment, by virtue of including appropriate logic in the package, the developer may obtain a session ID from the subscriber org. This session ID may be marked as restricted by the appropriate PAC settings (e.g., based on the PAC settings of the package from which this session ID is obtained). In this case, only specified set of actions may be allowed to be executed using this session ID.

In another embodiment, objects contained in the package may be treated as one in terms of PAC CRUD and Metadata API permissions. Metadata API access for objects of the package may be disabled by default. Full PAC CRUD permissions may always be granted to all objects in the package. Neither developer nor subscriber may be able to disable full PAC CRUD permissions for objects in the package. Subscribers may not be able to take away PAC CRUD permissions or Metadata API access specified by developer for a given entity. Subscriber may be able to grant more permissions for a given entity. PAC CRUD and Metadata API permissions may be configured at an entity level, not at a field level.

Additionally, a Developer may not be able to specify PAC settings for local custom entities. It may be possible for the developer to manually enable PAC on platform objects and associate entities. PAC CRUD and Metadata API permissions on associate entities may be set with 1-1 correspondence to permissions on parent entity, ie AccountShare may get read CRUD permission if Account entity was configured to have read CRUD permission. Subscriber may be able to specify PAC CRUD settings and Metadata API access on all entities in their org.

In another embodiment, enabling PAC on a package may enable standard UDD CRUD permissions automatically for entities for which PAC is not specified. We may take a white list approach and disable access to any entity not included in the package which does not have PAC explicitly specified. This may alter the way objects are accessed in Udd. Additionally, at package installation time, no page may be shown with PAC settings of the package being installed.

Also, in yet another embodiment, during spidering and object selection, static references for entities not included in the package may be evaluated and used to configure PAC CRUD settings for these entities. Only components that modify data may be taken into consideration: workflow outbound messages, workflow field updates, Apex classes/triggers, and VF pages/controllers may trigger PAC settings for entities involved.

If an entity not included in the package and which doesn't have appropriate PAC CRUD permissions set is referenced using Dynamic Apex an exception may be thrown, containing instructions to either remove the reference to the entity or set appropriate PAC CRUD permissions on it. If subscriber org does not have standard objects for which the PAC settings are specified in the package they have installed, we may keep track of these settings, without subscriber knowledge. If such standard object becomes available in subscriber org, we may then display appropriate PAC settings on Package Access Settings page.

Additionally, in one embodiment, partners may have a capability of calling Metadata API using the PAC restricted session id. By default, no Metadata API calls originating from partners with such session id may be allowed. It may now be possible for both developer and subscriber to specify ability to make Metadata API calls involving an entity. As with PAC CRUD settings, if a developer specified that they want Metadata API access for an entity, a subscriber may not be able to disable this access. A subscriber may be able to enable Metadata API access.

When creating the Metadata .zip file for the managed package, we may need to account for new xml tag inside the <objectPermissions> tag. This <mdApiAccess> tag (proposed name) may be set to true if the Metadata API access is enabled for the given entity. Another new tage, <permExplanation> (proposed name), may hold a short explanation of developer to subscriber as to why they set PAC on a given entity. <apiAccessLevel> tag will be remain, but its meaning may now change—it may signify whether or not the Metadata API permissions for "All Objects in Package" were turned on.

Further, in another embodiment, a current schema may include Tables core.dev_package_version and coreinstalled_package_version which may contain PAC_PERMISSION_LEVEL column (NOT NULL NUMBER). This can have a value of 0 (meaning the package does not have PAC settings enabled), 1 (not used), and 2 (meaning the package has PAC settings enabled). Table core.pac_entity_permissions contains column PERMISSIONS_ALLOWED1, which holds values 2, 3, 6, 7, 14, 15, which correspond to all possible permutations of entity CRUD permissions, besides the one with all CRUD permissions disabled.

Table 7 illustrates exemplary schema changes and suggested renaming, in accordance with one embodiment. Of course, it should be noted that the schema changes shown in Table 7 are set forth for illustrative purposes only, and thus should not be construed as limiting in any manner.

TABLE 7

Update core.dev_package_version PAC_PERMISSION_LEVEL to be NOT NULL CHAR(1). This column then can be set to 0 (PAC disabled) and 1 (PAC enabled).
Update core.dev_package_version to have API_ACCESS_LEVEL column, NOT NULL CHAR(1). This may be set to 1 if the developer enables Metadata API permission for "All objects in Package."
It maybe 0 otherwise.
Update core.installed_package_version to have API_ACCESS_LEVEL column, NOT NULL CHAR(1). This may be set to 0 if the developer didn't enable the Metadata API. If this version is an upgrade and subscriber had enabled Metadata API permission for the previous version, this may get set to 1. It may be 0 otherwise.
Update core.installed_package_version PAC_PERMISSION_LEVEL the same way as above.
Update core.pac_entity_permissions to include another column DEV_PAC_CRUD, NOT NULL NUMBER.
This could be set to −1 (if this is a developer org row), 0, 2, 3, 6, 7, 14, 15 corresponding to all possible permutations of entity CRUD permissions for the given entity as specified in the developer org at the time of package upload.
Update core.pac_entity_permissions to include another column MD_API_ACCESS, NOT NULL CHAR(1). It could be set to 0 (Metadata API disabled) or 1 (Metadata API enabled).
Update core.pac_entity_permissions to include another column DEV_MD_API_ACCESS, NOT NULL CHAR(1). It could be set to 0 (Metadata API disabled) or 1 (Metadata API enabled).
Update core.pac_entity_permissions to include another column PERM_EXPLANATION, VARCHAR2(120). This may hold a short explanation by developer for subscriber as to why developer needs to set PAC for the given entity. It could be left blank.
Suggested Renaming Rename PAC_PERMISSION_LEVEL to PAC_SET in core.dev_package_version and core.installed_package_version
Rename PERMISSIONS_ALLOWED1 to PAC_CRUD in core.pac_entity_permissions In another embodiment, standard objects and extended custom entities may be found in core.pac_entity_permissions. However, we may add platform entities and associate entities. Entities may be allowed to have 0 in this column.

In yet another embodiment, neither subscriber not developer may be able to disable full CRUD permissions for "All Objects In Package". In general, subscriber may only be able to alter PAC CRUD permissions and Metadata API access for an entity (thereby altering values of PAC_CRUD and MD_API_ACCESS columns for the corresponding entity in core.pac_entity_permissions) if the new values are greater than the ones in DEV_PAC_CRUD and DEV_MD_API_ACCESS respectively. In effect, this may allow subscribers to add permissions, while disallowing taking permissions away.

In one embodiment, if a developer specifies PAC settings (or Metadata API settings) for an entity, a subscriber may get the corresponding row in core.pac_entity_permissions. In this row DEV_PAC_CRUD and DEV_MD_API_ACCESS columns may be set to the values of PAC_CRUD and MD_API_ACCESS in the row for the corresponding entity in the developer org at package upload time. Appropriate xml tags may be introduced inside the <objectPermissions> tag for the package.xml file.

Additionally, in another embodiment, PAC settings may not be overwritten for a subscriber upon upgrades, ie once we insert a row into core.pac_entity_permissions for a given package for subscriber org, we may not alter this value upon upgrade to a new version of the package. This may change, such that the PAC_CRUD_new may be set to the value max (PAC_CRUD_old, DEV_PAC_CRUD_new). DEV_PAC_

CRUD may always be updated. In similar fashion, we may set MD_API_ACCESS_new to maximum of (MD_API_ACCESS_old, DEV_MD_API_ACCESS_new), and may always update the DEV_MD_API_ACCESS value.

Table 8 illustrates exemplary screen list details, in accordance with one embodiment. Of course, it should be noted that the screen list details shown in Table 7 are set forth for illustrative purposes only, and thus should not be construed as limiting in any manner.

TABLE 8 a) Dev Package Version Package Detail Page
   Remove the grey/white info header
   Remove API Access
   Add checkbox "Extension"
   If managed package, add "Package Security Settings" button
   If managed and contains insecure components, add a security info message with More Info link
b) A read only page for security info - may be accessible via the More Info link from the Package Detail Page. This page may contain an extended message along with the list of insecure components that prompted the security message in the first place. Components may be links to Component Detail pages.
c) Package Access Settings Page (read version)
   This may replace the existing Package Access Control page.
   CRUD boxes may remain.
   Change header to "Package Security Settings" and add header sections Object Name, Data Access, Setup Access, Explanation of Access to Subscribers
   may include one row with "All Objects in Package", for which Data Access is fully enabled and is immutable
   Rows are sorted alphabetically, based on the Object Name
d) Package Access Settings Page (edit version)
   Add Action column and populate with "Remove" link for all rows besides the All Objects in Package row.
   At the bottom of the Object Name column, may have picklist/input box, containing the objects available to add.
   For subscribers, objects included by developer may not be editable/removable
e) Package Installer Page(s)
   Remove Step 1 page, Approve Package API Access
   Add security info message to the Install Package step. The message may include Display Objects and More Info links.
f) Package Access Details popup - may be accessible via Display Objects link from the security info message above. It may contain the same information that would appear on Package Access Settings page, read version.
g) This may be the same security info message as b) above, except that the component names are not links.

Further, we may need a script to set Metadata API permissions to false for all packages currently using PAC. This may be disabled by default for all new managed packages. We may need scripts to fill API_ACCESS_LEVEL columns in core.dev_package version and core.installed_package_version. Further still, we may need a script to generate appropriate rows in core.pac_entity_permissions. In case of packages with Unrestricted PAC level, we may need to set full PAC CRUD permissions for all objects in the org. In case of packages with PAC enabled, we may need to generate rows for entities, access to which may be granted automatically when PAC gets enabled (to clarify, we may not be automatically configuring PAC for random objects). This may include generating new rows for associate entities if the parent entities are included. We may not be generating new rows for developer packages (they may be told to configure PAC access for entities that are causing issues).

In another embodiment, some of the above scripts may be consolidated—they're listed separately to point out their optional purpose. Additionally, in one embodiment, we may need to make sure the check for whether or not a given operation can be performed on a given entity with respect to PAC settings is not creating a serious lag. Existence and correctness of PAC CRUD permissions and Metadata API access may depend on creating a proper package.xml file inside the Metadata .zip Upgrading a script to generate the missing rows may be possible.

Additionally, the set of entities for which PAC settings are to be configured may be a small subset of all entities accessible in the org. At this point, we may not impose limits such as how many entities can have PAC configured for a given package. We may want to set a cut off as to how many (or what type) of these we display on the Package Security Settings page.

Further, existence and correctness of PAC CRUD permissions in developer org may depend on detecting references to entities in the package during spidering. Existence and correctness of PAC CRUD permissions and Metadata API access may depend on creating a proper package.xml file inside the Metadata .zip. The ability to detect whether or not a given session ID is PAC restricted may depend on correct session object construction (we may be interested in apiClientAllPackageId field of the session object being set correctly).

Further still, in another embodiment, new and modified screens may be internationalized, including the security info messages. PAC settings may be configured on certain entities in developer org, and these settings exist and may not be taken away in the subscriber org. Metadata API access may be configured on certain entities in developer org, and these settings may exist and may not be taken away in subscriber org.

Also, components such as Apex may be included that have static references to entities outside the package and appropriate PAC permissions may be set on these entities (e.g., see spidering). With a managed package, partners may not execute certain action calls with PAC restricted session ID. Additionally, the subscriber may view correct PAC CRUD/Metadata API permissions set by developer, may not be able to take them away and may add to them. Also, Security Info messages may exist both on developer and subscriber sides, and a picklist/input box may exist on a Package Access Settings Page. Further, PAC permissions may appear/disappear when references to entities get added/removed from the package on developer side. Cache invalidation may be appropriately addressed.

In another embodiment, changes may be made to the way we check (most likely not the way, but the location of the check) API client's session ID for whether or not it is PAC restricted. In some places we may add this check in the first place—see Risks and Omissions. Additionally, accessibility may not change. VisualForce may be used to develop the only page with considerable changes, Package Access Settings Page.

In yet another embodiment, a blacklist approach may be used when it comes to allowing certain action calls when clients use a PAC restricted session id. We may convert this to a white list approach and prohibit the use of all action calls with PAC restricted session id, unless the code has been annotated by a developer to indicate that it should be allowed to run.

Further, an upgrade script may be used to generate missing PAC rows.

Figure 3:
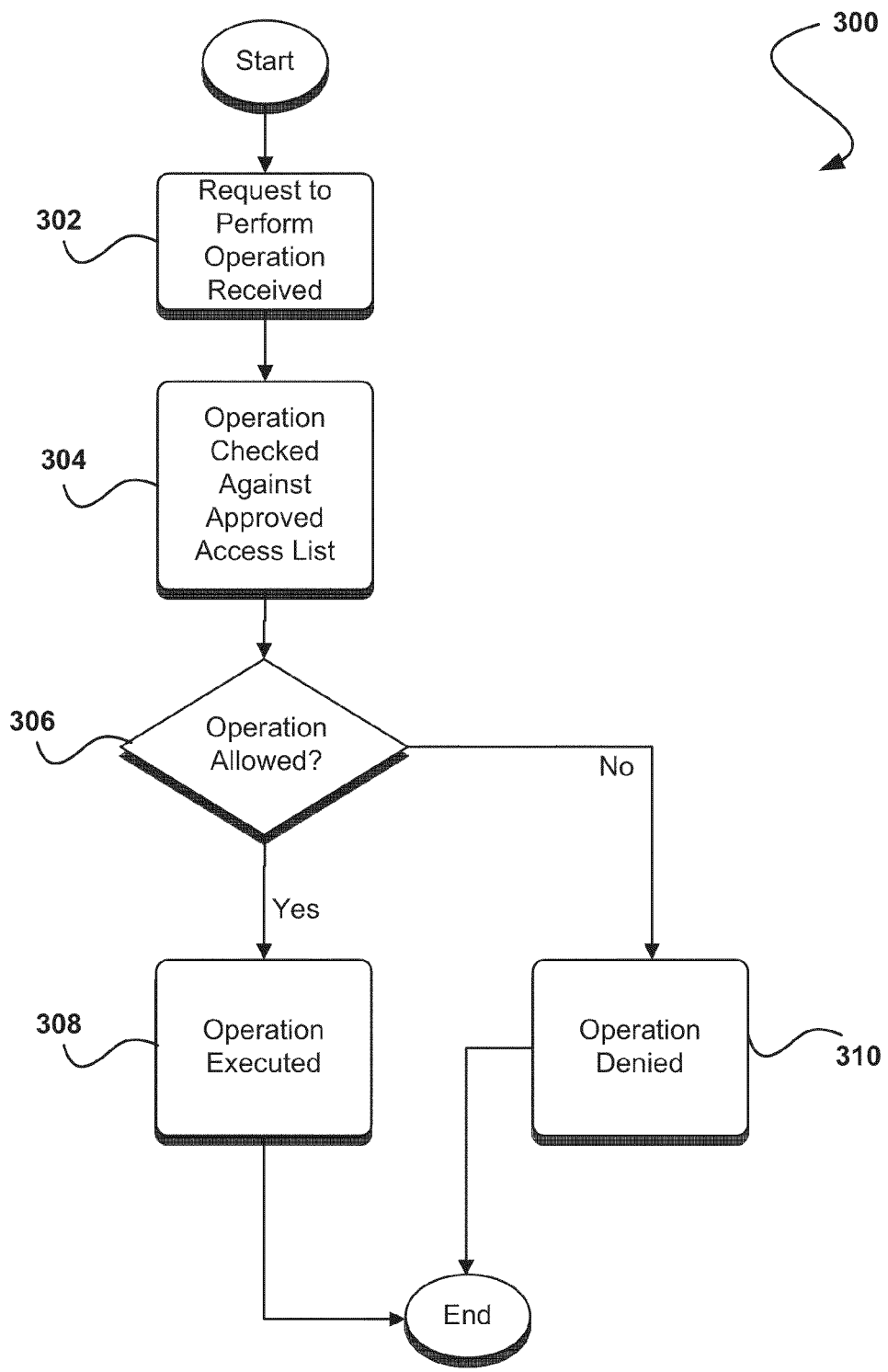
FIG. 3 illustrates a method for conditionally allowing an operation to be performed, in accordance with yet another embodiment.

FIG. 3 illustrates a method 300 for conditionally allowing an operation to be performed, in accordance with yet another embodiment. As an option, the present method 300 may be carried out in the context of the functionality of FIGS. 1-2. Of course, however, the method 300 may be carried out in any desired environment. Again, the aforementioned definitions may apply during the present description.

As shown in operation 302, a request to perform an operation is received. In one embodiment, the request to perform the operation may be sent by an application installed within a multi-tenant on-demand database system. For example, an application installed in a user account within the multi-tenant on-demand database system may send the request to perform the operation. In another embodiment, the request to perform the operation may include a request for the operation to be performed within the multi-tenant on-demand database system.

In another embodiment, the operation may include accessing one or more data elements inside or outside the multi-tenant on-demand database system. In yet another embodiment, the operation may include performing one or more actions on the data elements. In still another embodiment, the operation may include accessing the one or more data elements through one or more methods of access.

Additionally, as shown in operation 304, the requested operation is checked against an approved access list. In one embodiment, the approved access list may be created by a provider of the multi-tenant on-demand database system. In another embodiment, the approved access list may be created by a user of the multi-tenant on-demand database system. In another embodiment, the approved access list may be dynamically created based on one or more elements associated with the user, the provider, etc. For example, the approved access list may be created based on a policy of the user, provider, etc.

In yet another embodiment, the approved access list may include a list of one or more operations that are allowed (e.g., within the multi-tenant on-demand database system, etc.). For example, the approved access list may indicate one or more data elements that may be accessed inside or outside the multi-tenant on-demand database system, one or more actions that may be performed on the data elements, one or more methods of access that may be allowed for an application, etc.

Further, as shown in decision 306, it is determined whether the operation is allowed. For example, it may be determined whether the operation requested to be performed involves access that is found within the approved access list. If in decision 306 it is determined that the operation is allowed, then in operation 308 the operation is executed. For example, the operation may be performed within the multi-tenant on-demand database system. However, if in decision 306 it is determined that the operation is not allowed, then in operation 310 the operation is denied. For example, the operation may not be performed within the multi-tenant on-demand database system. In this way, access requested by the operation of an application may be controlled by a user of the application, and the user may therefore be able to contain the application to their specifications. Additionally, one or more boundaries may be created within an internal communications platform (e.g., the multi-tenant on-demand database system, etc.).

FIGS. 4A-4E illustrate an exemplary developer interface workflow, in accordance with one embodiment. As an option, the present workflow may be carried out in the context of the functionality of FIGS. 1-3. Of course, however, the workflow may be carried out in any desired environment. Again, the aforementioned definitions may apply during the present description.

Figure 4A:
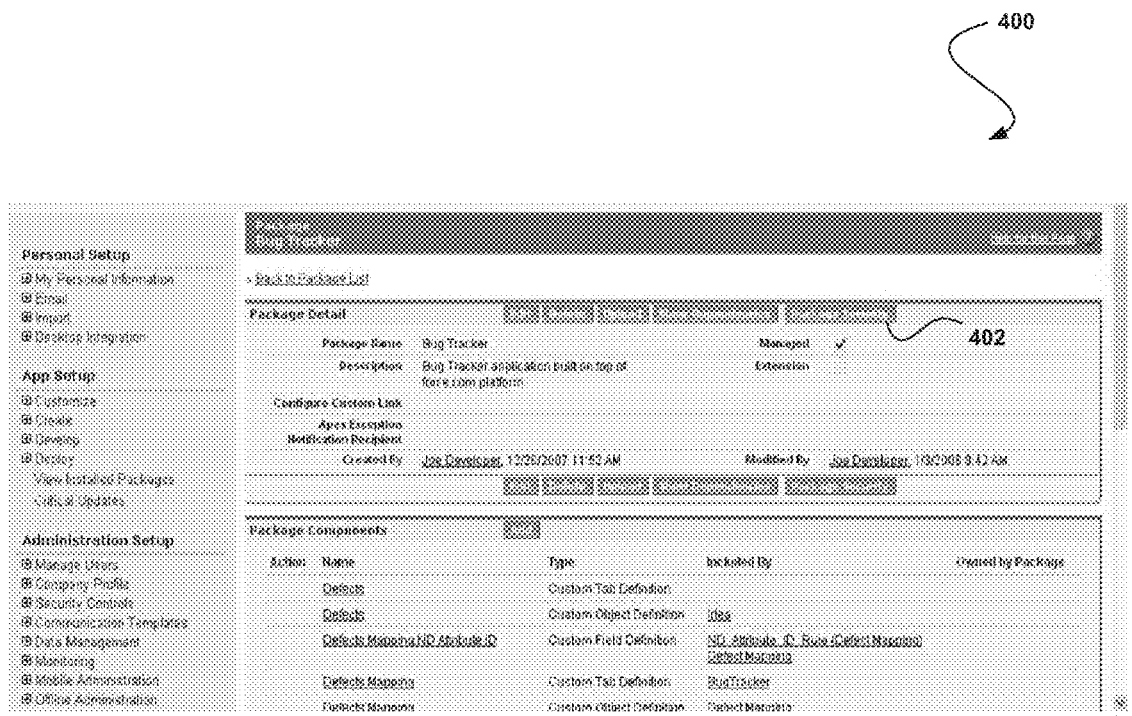
FIGS. 4A-4E illustrate an exemplary developer interface workflow, in accordance with one embodiment.

As shown, FIG. 4A illustrates a package window 400 of a developer interface, which displays a plurality of details relating to a particular package created by a developer. It should be noted that although the present developer interface relates to a "Bug Tracker," any package created by a developer may be presented. Additionally, the package window 400 includes an package security icon 402 that can be used to edit the security settings of the package. In one embodiment, after a developer has completed creation of the package, the developer may edit the security settings of the package by selecting the icon 402.

Figure 4B:
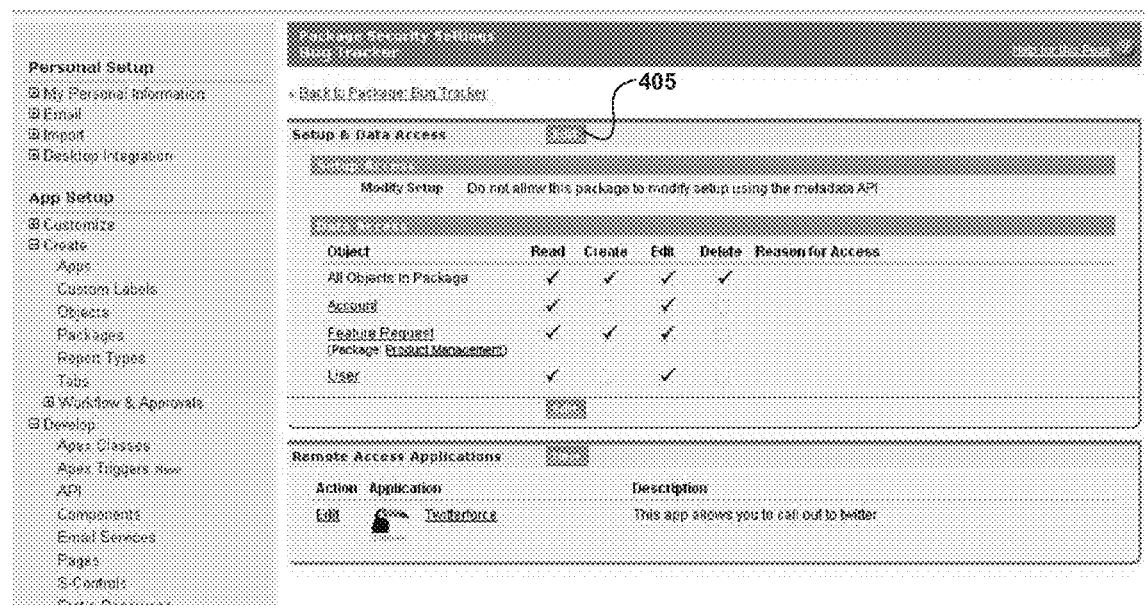

Additionally, FIG. 4B illustrates a security settings window 404 of the developer interface, which displays an existing setup and data access of the package created by the developer. As shown, the security settings window 404 is accessed by selecting the package security icon 402 found in FIG. 4A. Additionally, the security settings window 404 includes an edit icon 405 that is used to edit a setup and data access for the package.

Figure 4C:
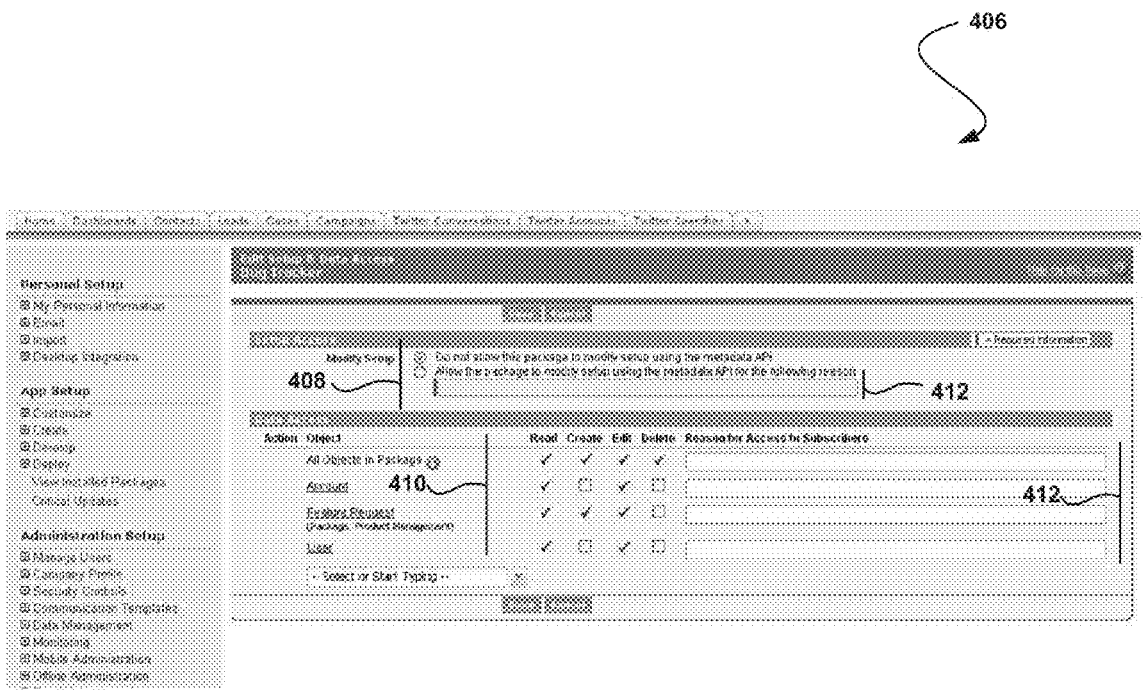

Further, FIG. 4C illustrates an edit setup and data access window 406 of the developer interface that is accessed by selecting the edit icon 404 found in FIG. 4B. The edit setup and data access window 406 includes a selectable field 408 where the developer may select whether the package is allowed to modify a setup utilizing a metadata API, as well as selectable fields 410 where the developer may select whether the package is allowed one or more of read, create, edit, and delete access to a plurality of objects.

Figure 4D:
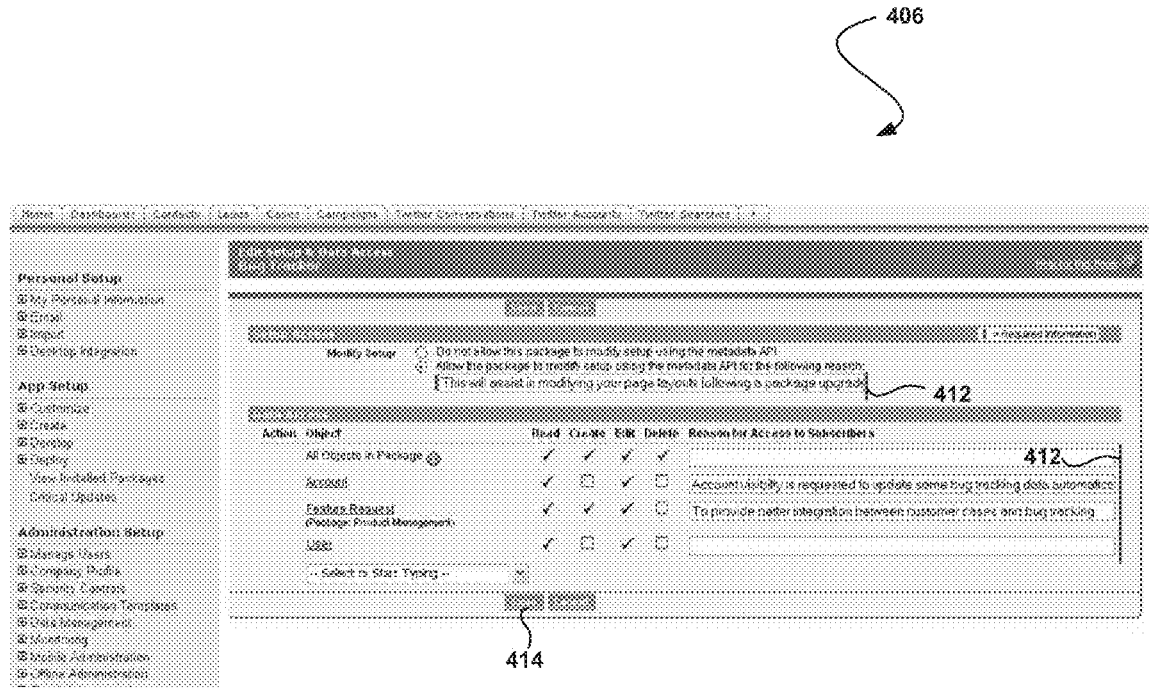

Additionally, the edit setup and data access window 406 includes forms 412 for inputting one or more reasons for allowing setup and data access as denoted in fields 408 and 410. In this way, the developer may provide an explanation to subscribers of the package as to why the package is requesting certain access. Further still, FIG. 4D illustrates the edit setup and data access window 406 after the developer has input reasons for allowing setup and data access in forms 412. The developer may save such input my selecting the save icon 414.

Figure 4E:
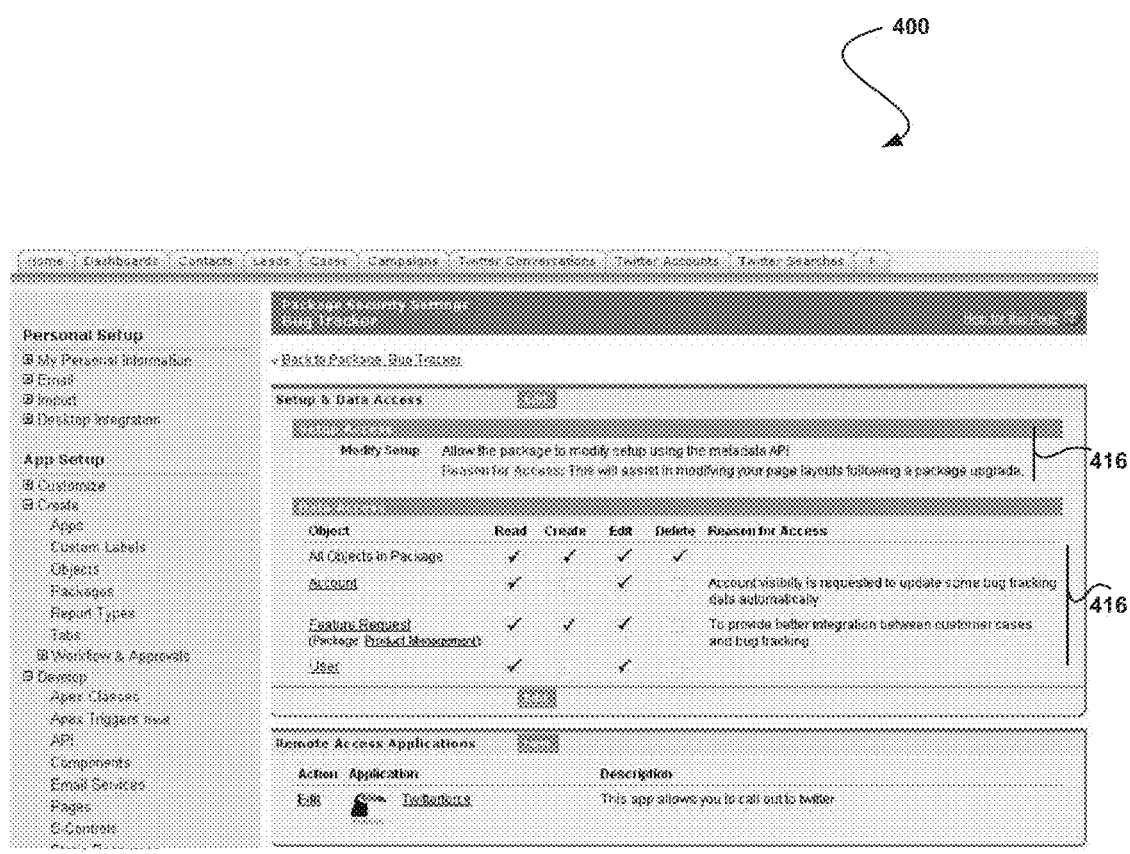

Also, FIG. 4E illustrates an updated package window 400 once the developer has saved their reasons for allowing setup and data access. Such submitted reasons are displayed to the developer for review in the reasons location 416. In this way, a developer may create a package, add components to that package, and update security settings associated with the package.

Figure 5A:
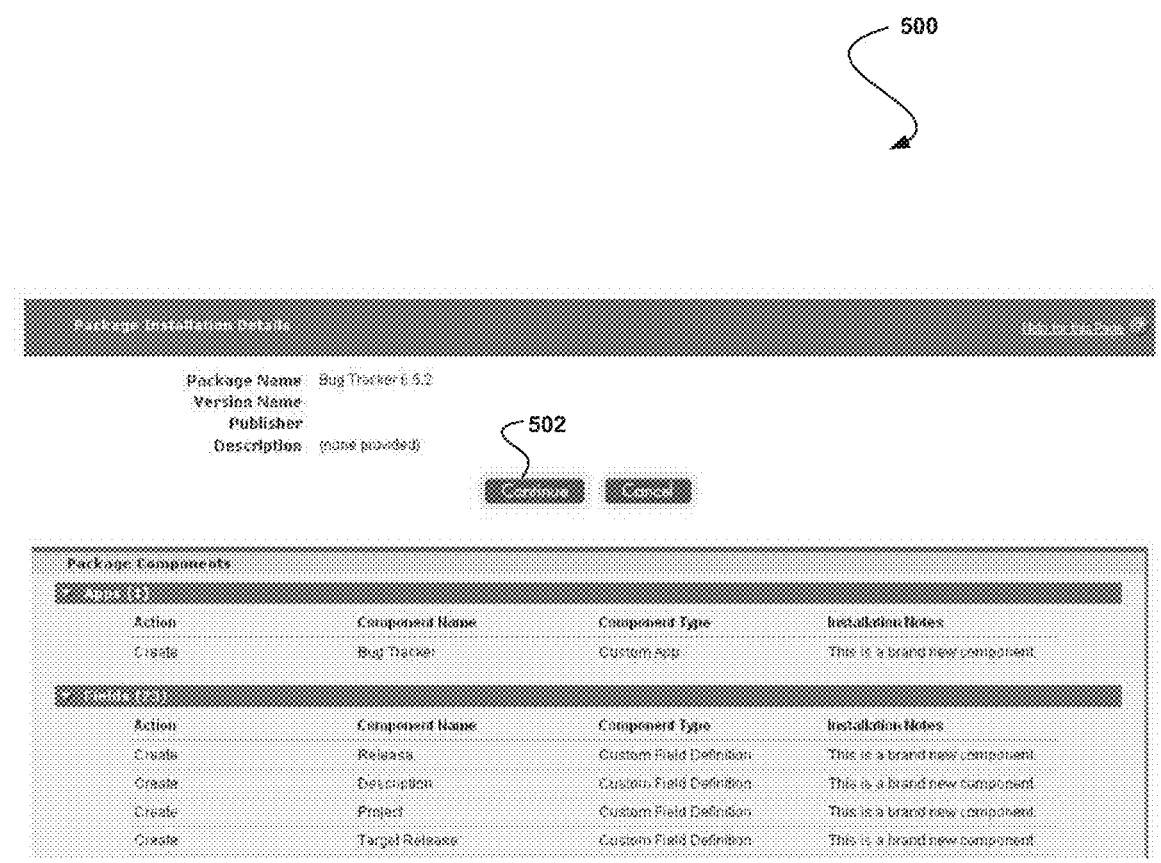
FIGS. 5A-5N illustrate an exemplary subscriber installation workflow, in accordance with another embodiment.
Figure 5B:
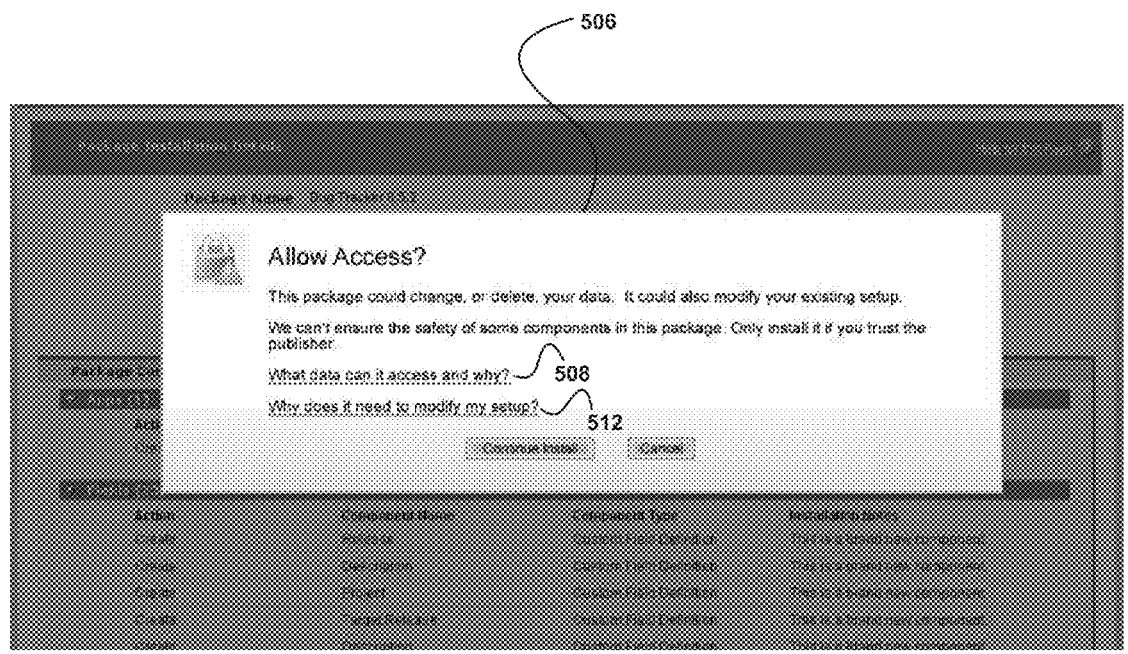
Figure 5C:
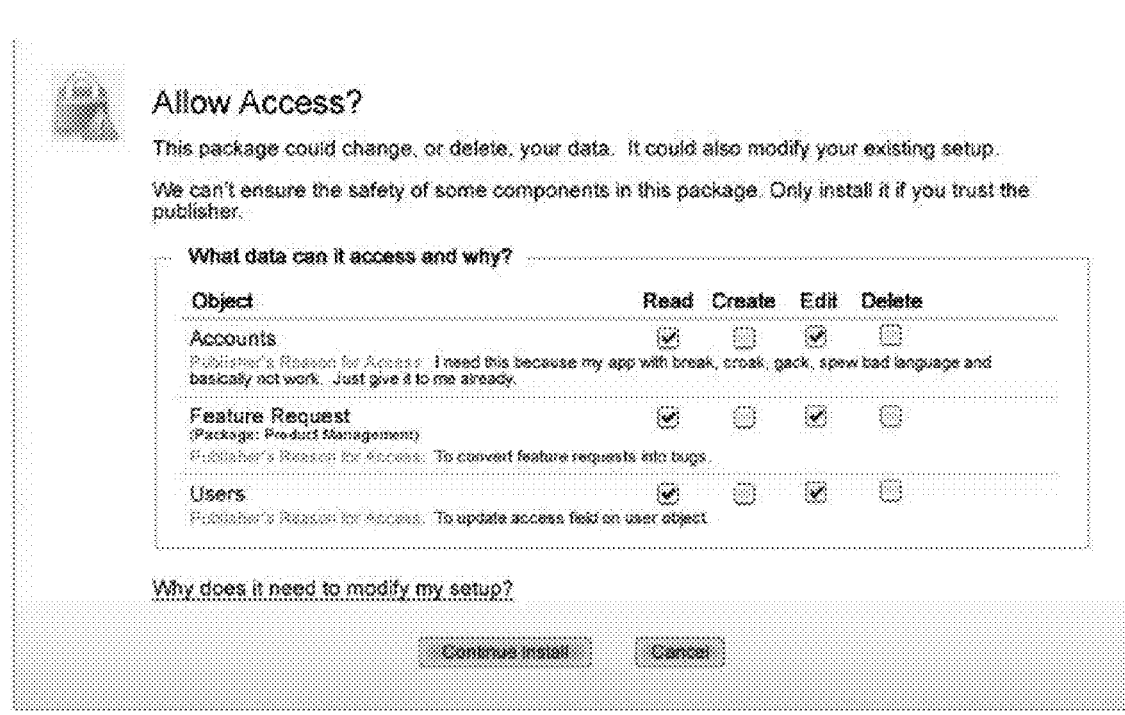
Figure 5D:
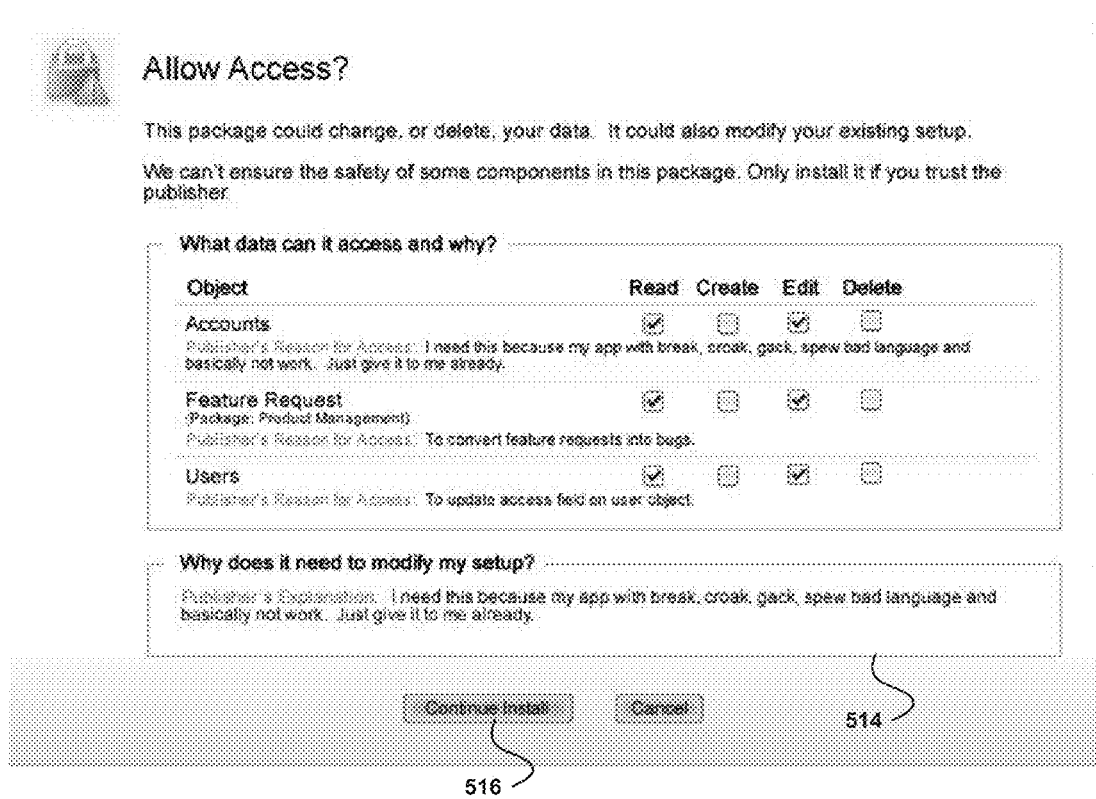
Figure 5E:
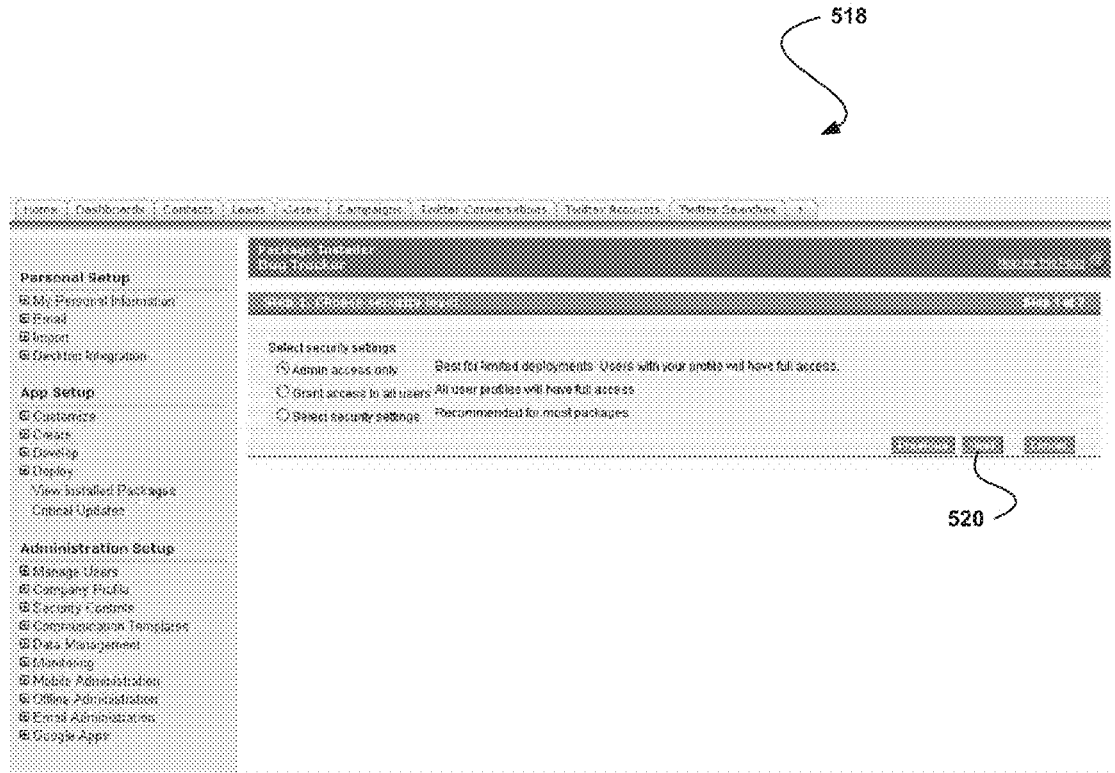
Figure 5F:
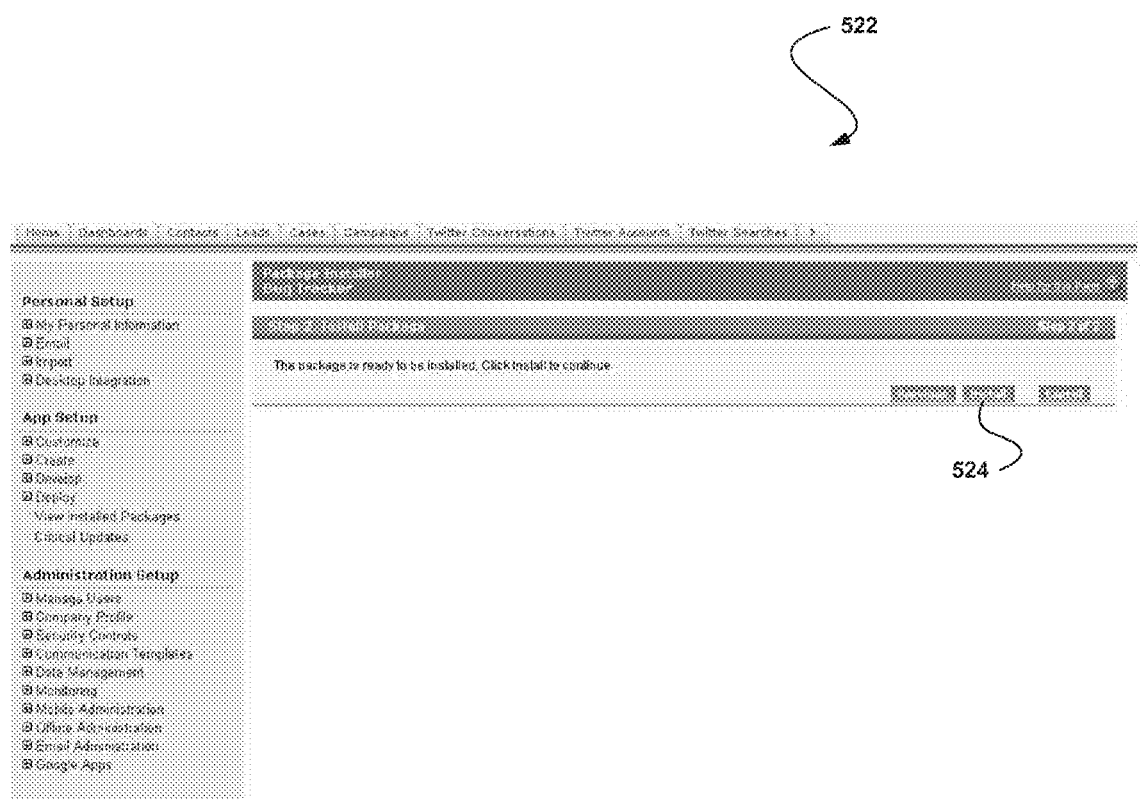
Figure 5G:
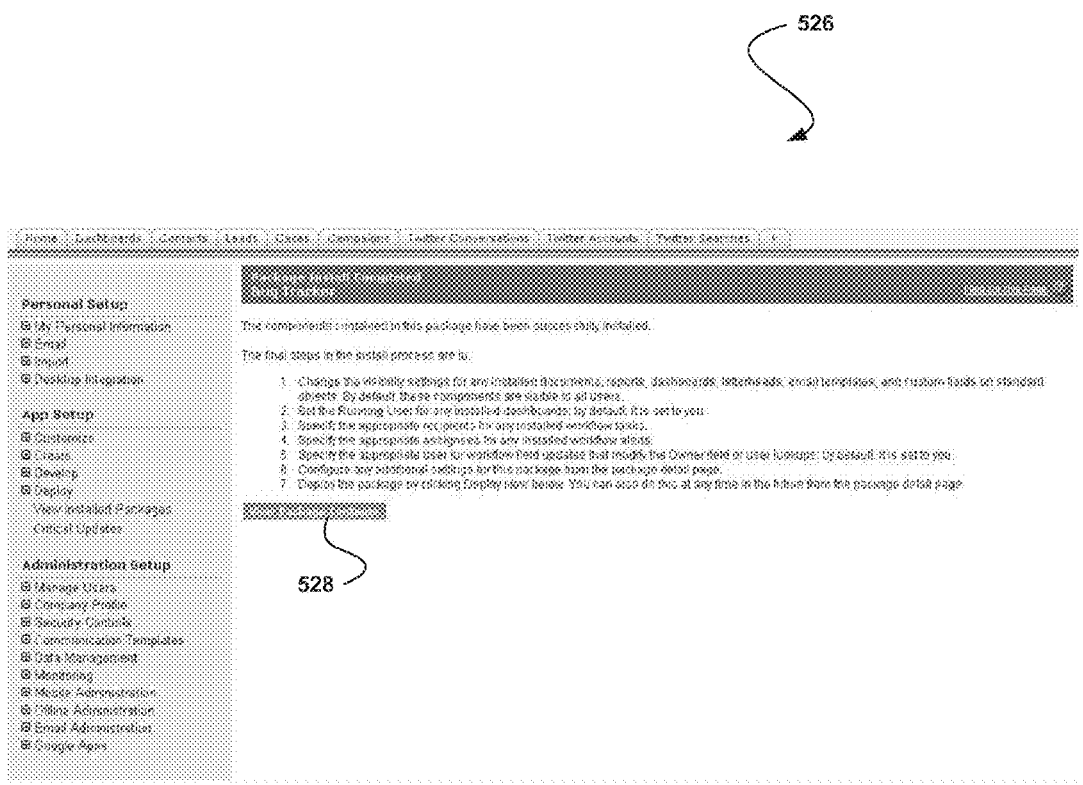
Figure 5H:
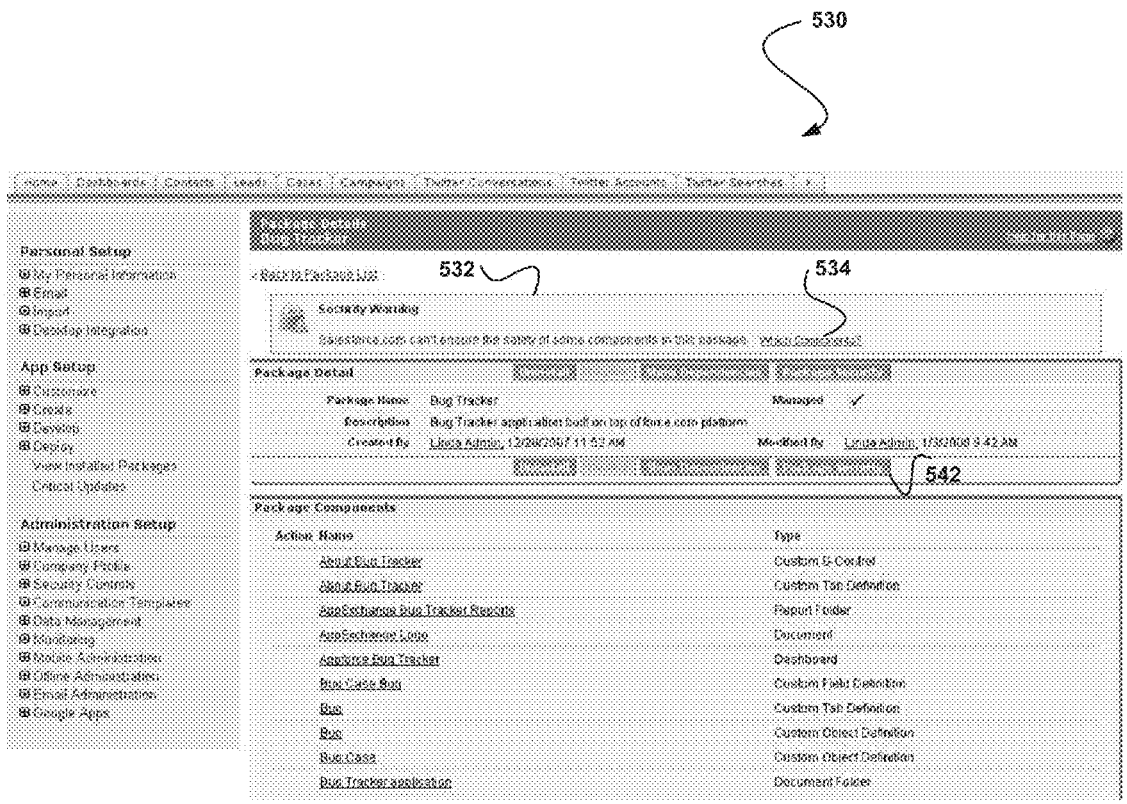
Figure 5I:
Figure 5J:
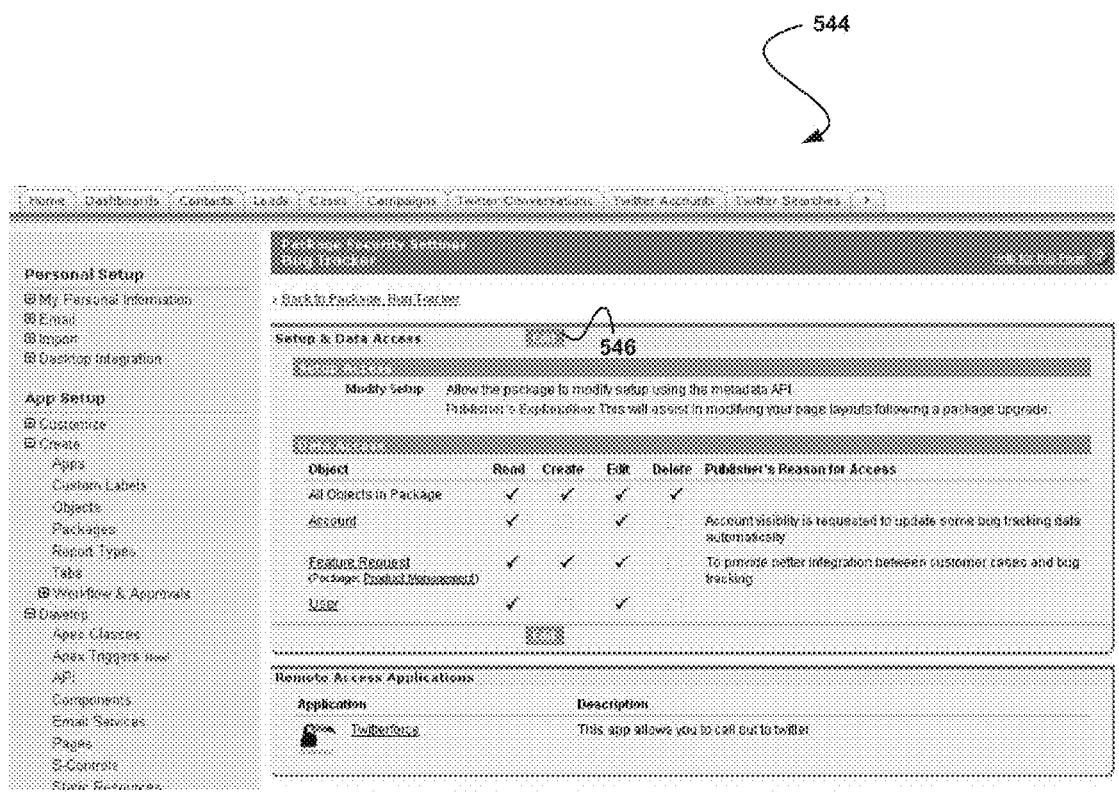
Figure 5K:
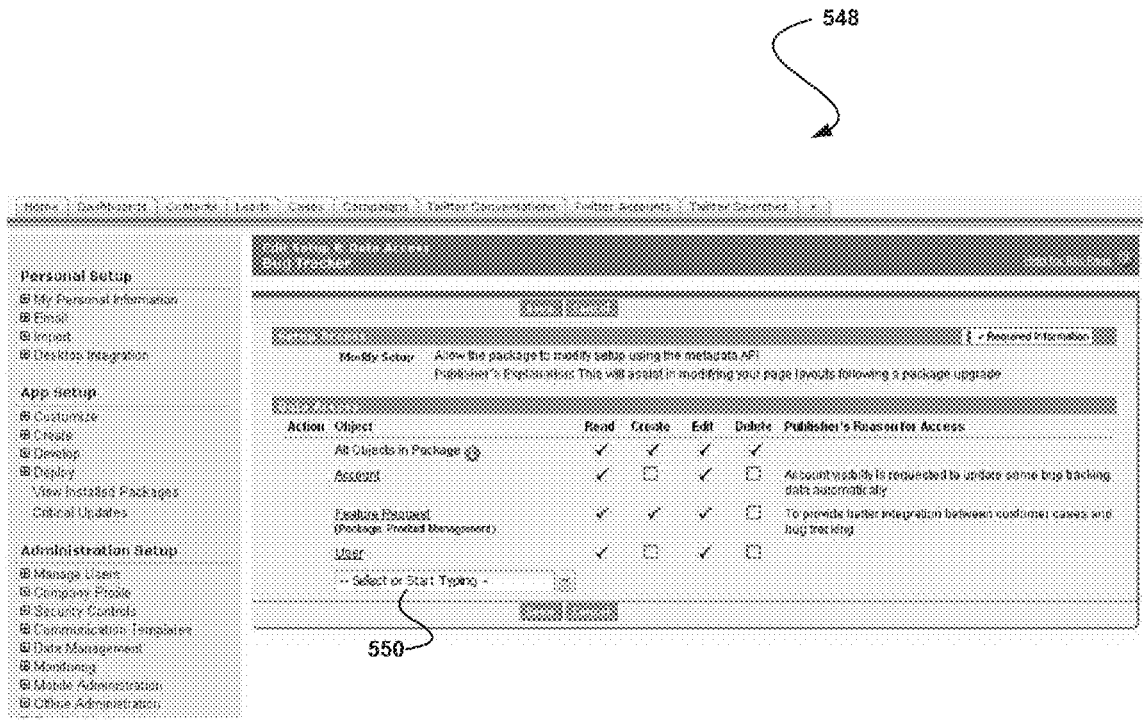
Figure 5L:
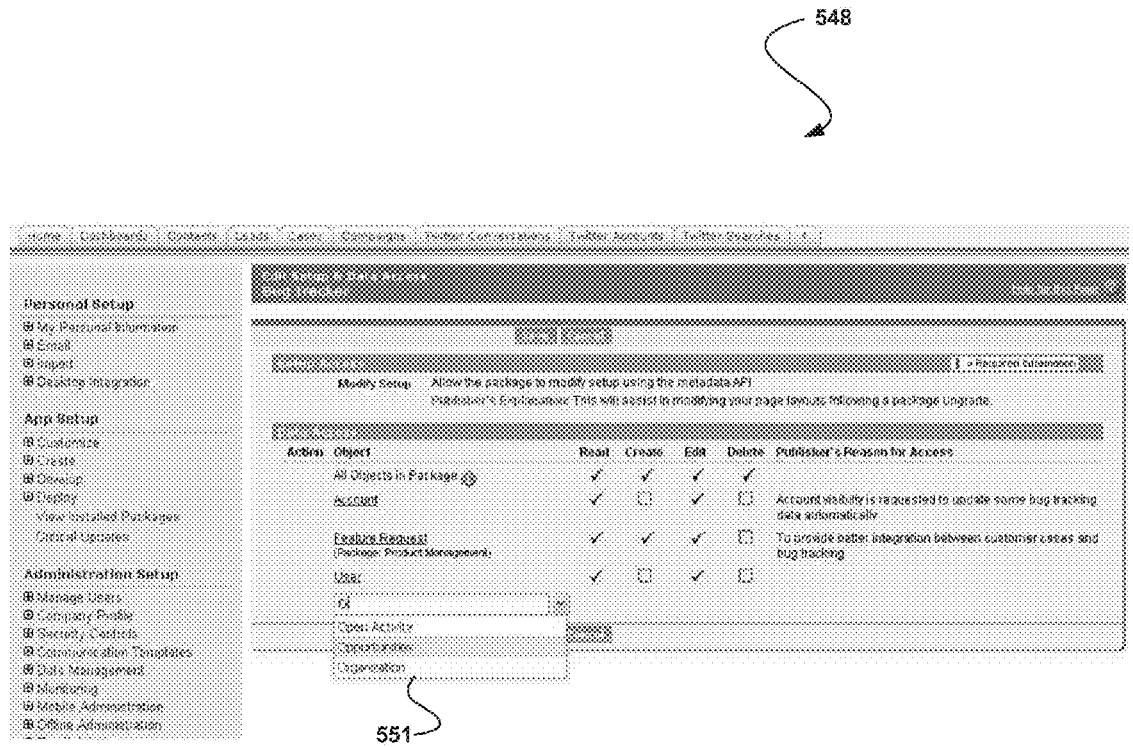
Figure 5M:
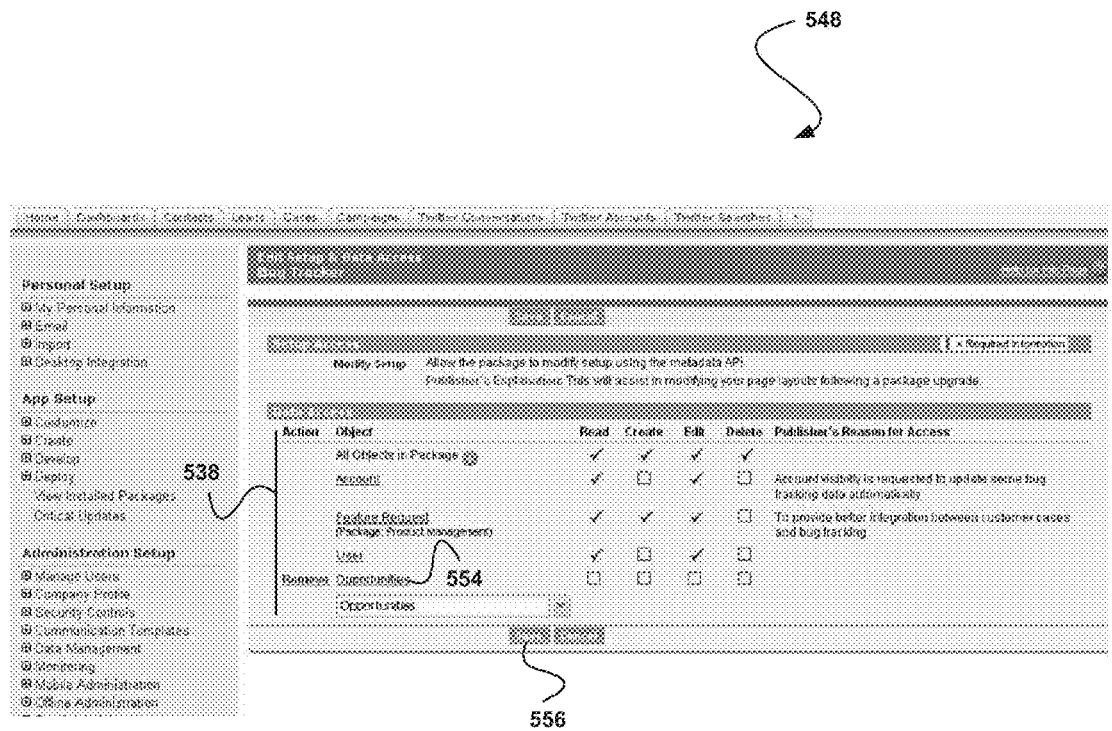
Figure 5N:
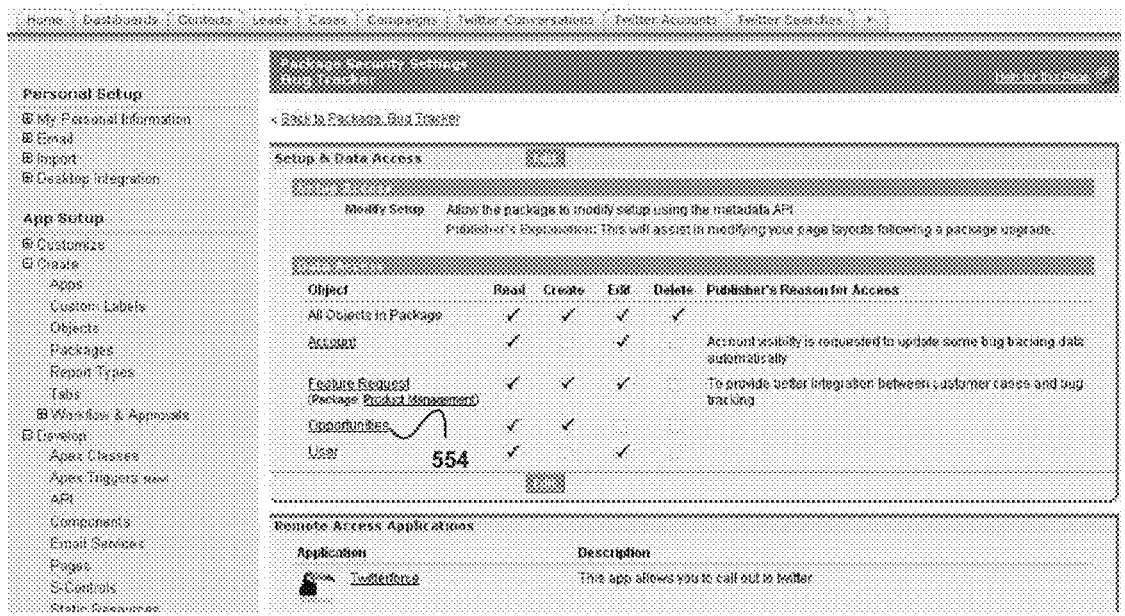

FIGS. 5A-5N illustrate an exemplary subscriber installation workflow, in accordance with one embodiment. As an option, the present workflow may be carried out in the context of the functionality of FIGS. 1-4E. Of course, however, the workflow may be carried out in any desired environment. Again, the aforementioned definitions may apply during the present description.

As shown in FIG. 5A, a package installation details window 500 is provided to a subscriber who desires to install a particular package. Again, it should be noted that although the present developer interface relates to a "Bug Tracker 6.5.2," any package desired to be installed by a subscriber may be presented. As shown, when the subscriber decides to proceed with the installation of the package, the subscriber selects the continue icon 502.

In response to the subscriber's selection of the continue icon 502, a warning 506 is provided to the subscriber, as shown in FIG. 5B. The warning indicates to the subscriber that the package could change or delete subscriber data and could modify the subscriber's existing setup (e.g., the subscriber's setup within the multi-tenant on-demand database system, etc.). By clicking on the "What data can it access and why?" icon 508, further information 510 regarding specific data access is displayed to the subscriber, as shown in FIG. 5C. By clicking on the "Why does it need to modify my setup?" icon 512; a publisher's explanation 514 as to why the package needs to modify the subscriber's setup is provided to the subscriber, as shown in FIG. 5D.

Additionally, by clicking on the "continue install" icon 516 of FIG. 5D, a security level of the package to be installed is then selected from window 518 of FIG. 5E. After a security level is chosen, the subscriber clicks on the "next" icon 520, which takes the subscriber to an install package page 522, as shown in FIG. 5F, where the subscriber then installs the package by selecting the "Install" icon 524.

After selecting the "Install" icon 524, the package is installed (e.g., within the multi-tenant on-demand database system, etc.), and a package install completed page 526 is provided to the subscriber, as shown in FIG. 5G. By clicking on the "View Package Contents" icon 528 of the package install completed page 526, a package details page 530 is provided to the subscriber, as shown in FIG. 5H. The package details page 530 includes a warning 532 to the subscriber, notifying the subscriber that the safety of some of the components in the installed package is not ensured by the provider (e.g., the provider of the multi-tenant on-demand database system, etc.). By selecting the "Which Components?" link 534, the subscriber is provided with a security warning information page 536, as shown in FIG. 5I. The security warning information page 536 includes a list 538 of components whose safety cannot be ensured, as well as a general security warning 540 explaining possible actions the components might take.

Additionally, by selecting the "Package Security" icon 542 in the package details page 530 of FIG. 5H, the subscriber is provided with a package security settings page 544 that illustrates all existing setup access and data access for the package, as shown in FIG. 5J. By selecting the "edit" icon 546 of the package security settings page 544, the subscriber is provided with an edit setup and data access page 548, as shown in FIG. 5K. By selecting field 550 of the edit setup and data access page 548, the subscriber may enter one or more characters 551 into such field, as shown in FIG. 5L, and such entry 551 in the field may be added to the list of data access objects as an additional object 554, as shown in FIG. 5M.

Further, by selecting the "save" icon 556 of the edit setup and data access page 548, the added object 554 is added to the package security settings page 558, as shown in FIG. 5N. In this way, a subscriber may extend the access of the package to one or more objects that may not have been known by the developer, but that the subscriber wants the package to operate across.

Figure 6:
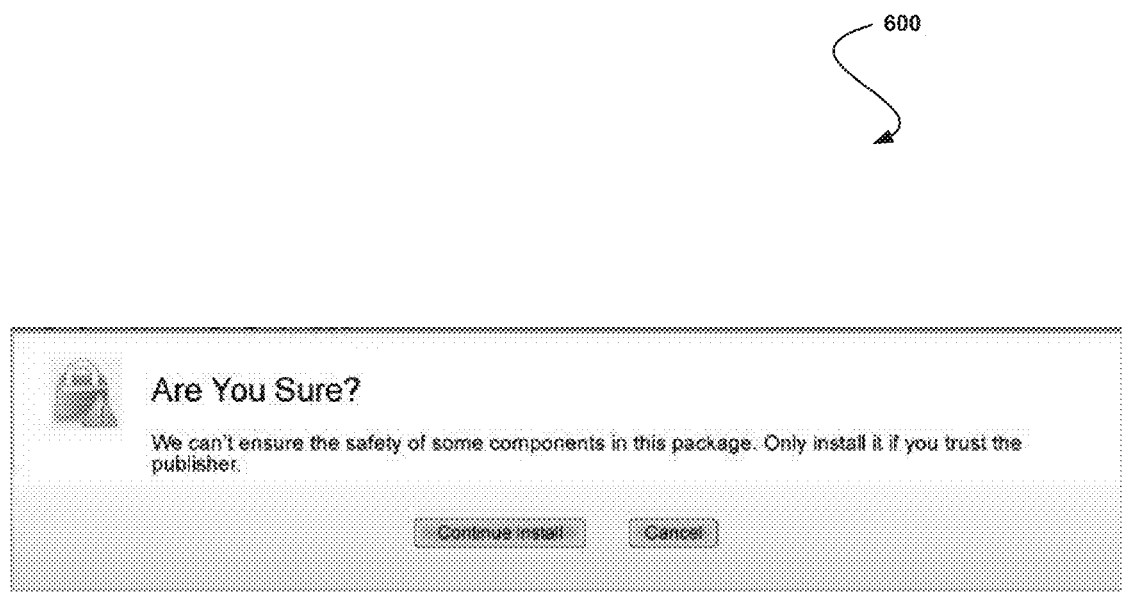
FIG. 6 illustrates an exemplary warning indicating to a subscriber that the safety of components of a package to be installed is not ensured, in accordance with another embodiment.
Figure 7:
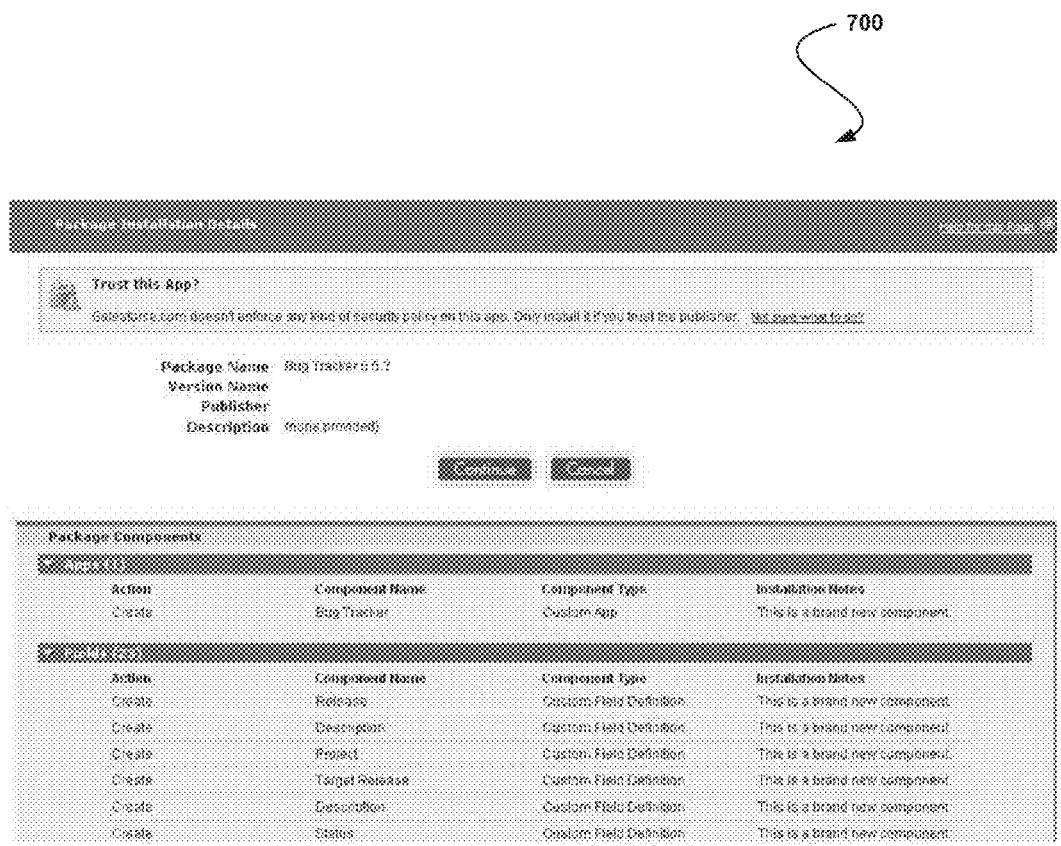
FIG. 7 illustrates an exemplary warning indicating to a subscriber that no security policy is enforced on a package to be installed, in accordance with another embodiment.

In another embodiment, a warning may be provided to the subscriber if only unsafe components are included within a package to be installed. For example, FIG. 6 illustrates an exemplary warning 600 indicating to a subscriber that the safety of components of a package to be installed is not ensured. Additionally, in yet another embodiment, a warning may be provided to the subscriber if the package is unmanaged or not managed by package access control. For example, FIG. 7 illustrates an exemplary warning 700 indicating to a subscriber that no security policy is enforced on a package to be installed. In this way, the subscriber may be notified of potential issues associated with a package prior to the package being installed.

System Overview

Figure 8:
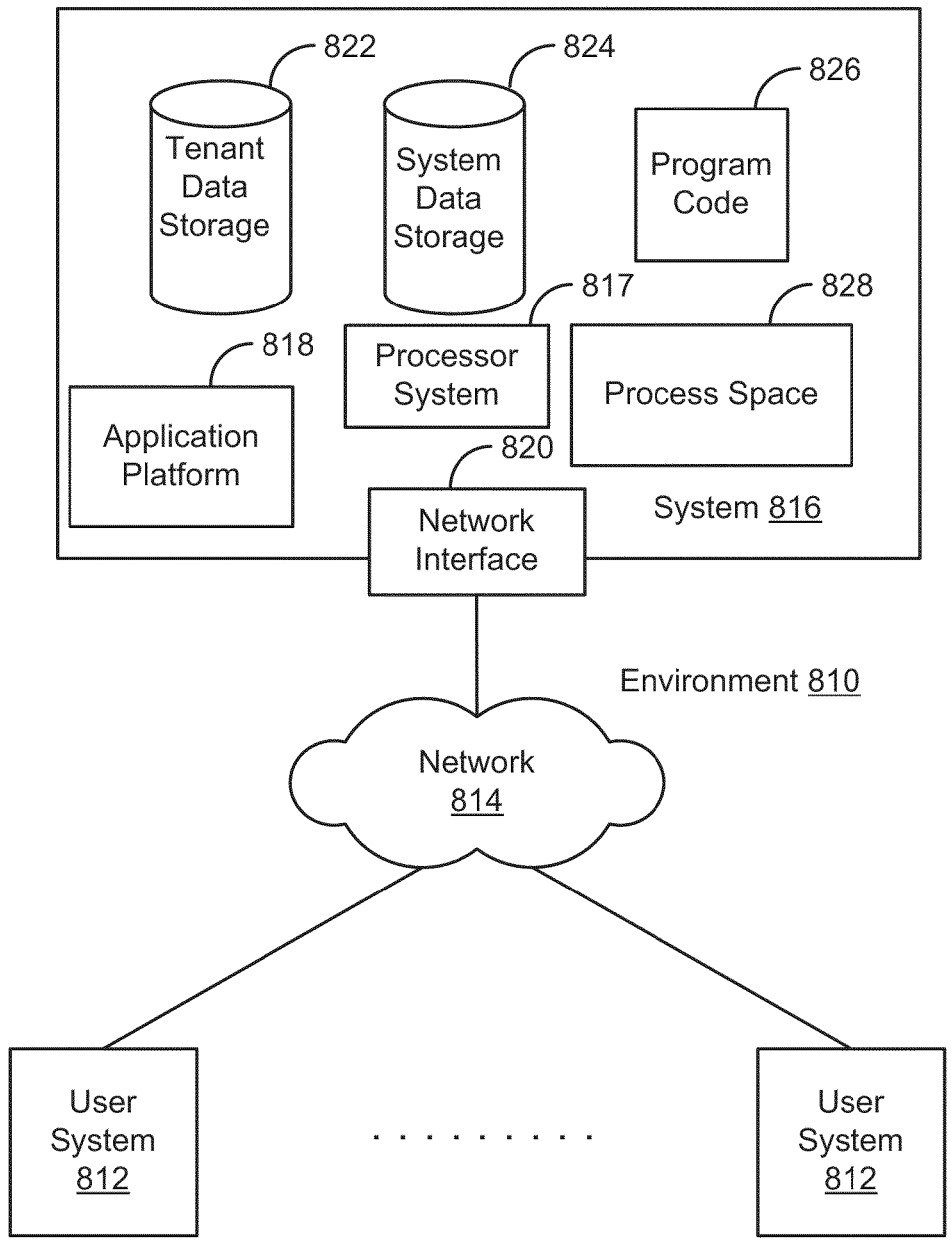
FIG. 8 illustrates a block diagram of an example of an environment wherein an on-demand database system might be used.

FIG. 8 illustrates a block diagram of an environment 810 wherein an on-demand database system might be used. Environment 810 may include user systems 812, network 814, system 816, processor system 817, application platform 818, network interface 820, tenant data storage 822, system data storage 824, program code 826, and process space 828. In other embodiments, environment 10 may not have all of the components listed and/or may have other elements instead of, or in addition to, those listed above.

Environment 810 is an environment in which an on-demand database system exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8 (and in more detail in FIG. 9) user systems 812 might interact via a network 814 with an on-demand database system, which is system 816.

An on-demand database system, such as system 816, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database system 816 may include an application platform 818 that enables creation, managing and executing one or more applications developed by the provider of the on-demand database system, users accessing the on-demand database system via user systems 812, or third party application developers accessing the on-demand database system via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a Mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
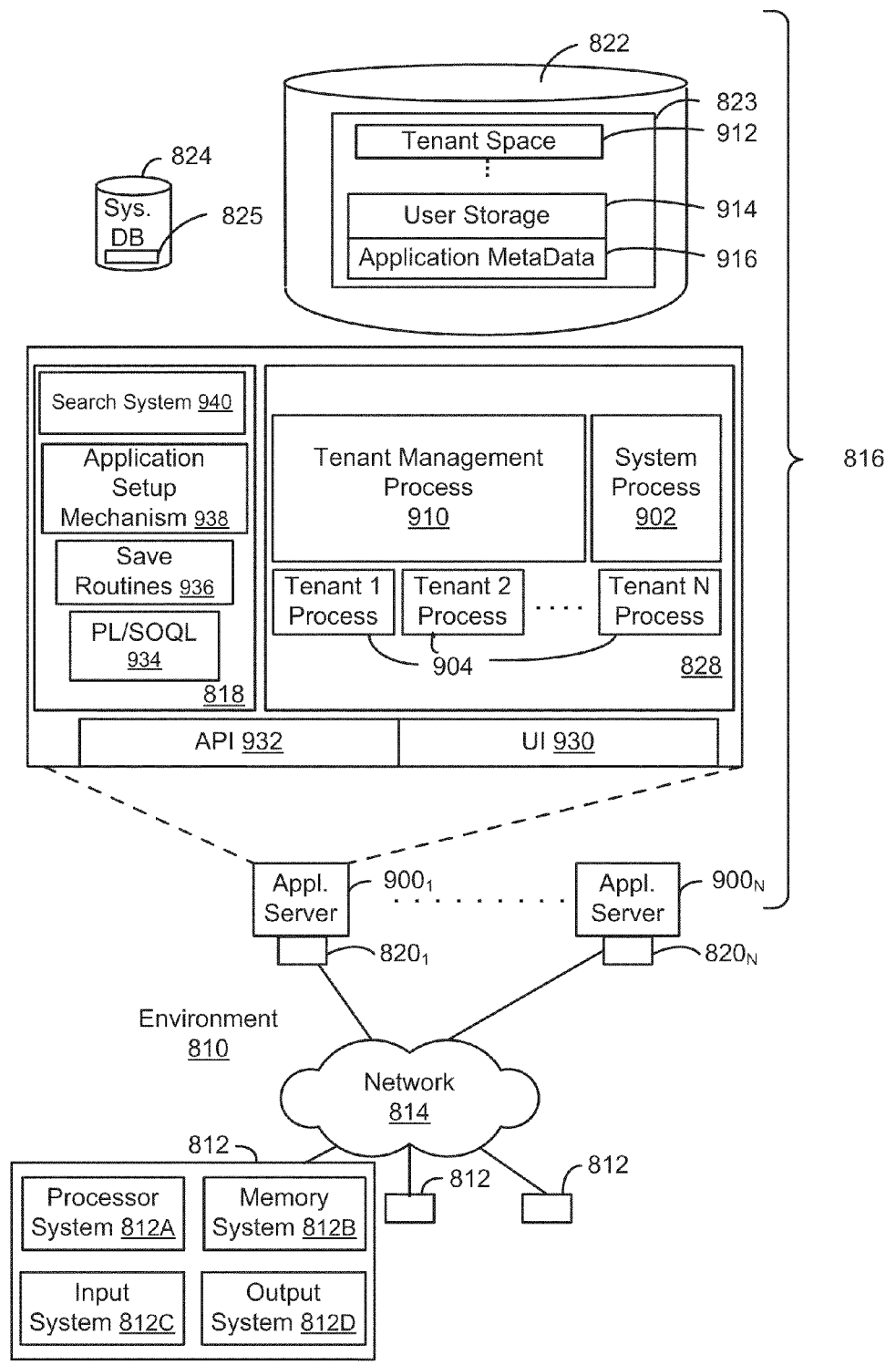
FIG. 9 illustrates a block diagram of an embodiment of elements of FIG. 9 and various possible interconnections between these elements.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer readable medium having a computer readable program code embodied therein, the computer readable program code causing a computer to implement a method, the method comprising:
   receiving, at a system, a request to install application code, the system configured to host one or more applications;
   identifying by the system prior to an installation of the application code within the system one or more actions required to be performed by the system during the installation of the application code, where the one or more actions include accessing data stored within the system, where the data required to be accessed during the installation of the application code is separate from the application code to be installed within the system;
   identifying, by the system, a developer of the application code; and
   conditionally allowing, by the system, the installation of the application code within the system, based on a comparison of the one or more actions to be performed by the system during the installation of the application and the identified developer of the application code against one or more rules.

2. The computer program product of claim 1, wherein the developer is associated with the system.

3. The computer program product of claim 1, wherein the one or more actions further include communicating the data outside of the system by the application code.

4. The computer program product of claim 1, wherein the one or more actions further include operations that are performed on the data.

5. The computer program product of claim 1, wherein the access to the data further includes at least one of reading the data accessed by the application code, updating the data accessed by the application code, and deleting the data accessed by the application code.

6. The computer program product of claim 1, wherein the one or more actions are identified by analyzing the application code.

7. The computer program product of claim 6, wherein the application code is statically introspected in order to determine what data is to be accessed by the application code and how such access is to occur.

8. The computer program product of claim 1, wherein the identified one or more actions are presented to an entity associated with the application code.

9. The computer program product of claim 1, wherein a user is presented with the one or more actions.

10. The computer program product of claim 9, further comprising receiving input from the user in response to the presentation of the one or more actions to the user.

11. The computer program product of claim 10, wherein the installation of the application code is also based on the input from the user.

12. The computer program product of claim 1, further comprising extending the one or more actions required with respect to the installation of the application code, based on the identifying.

13. The computer program product of claim 12, wherein extending the one or more actions required with respect to the installation of the application code includes adding or extending access to the data of the system.

14. The computer program product of claim 1, wherein the installation of the application code is allowed within the system if the one or more rules are met by the one or more actions.

15. The computer program product of claim 1, wherein the installation of the application code is not allowed within the system if the one or more rules are not met by the one or more actions.

16. The computer program product of claim 1, wherein the one or more rules indicate one or more entities associated with the application code that are determined to be trusted entities.

17. A method, comprising:
   receiving, at a system, a request to install application code, the system configured to host one or more applications;
   identifying by the system prior to an installation of the application code within the system one or more actions required to be performed by the system during the installation of the application code, where the one or more actions include accessing data stored within the system, where the data required to be accessed during the installation of the application code is separate from the application code to be installed within the system;
   identifying, by the system, a developer of the application code; and
   conditionally allowing, by the system, the installation of the application code within the system, based on a comparison of the one or more actions to be performed by the system during the installation of the application and the identified developer of the application code against one or more rules.

18. An apparatus, comprising:
a processor for:
   receiving, at a system, a request to install application code, the system configured to host one or more applications;
   identifying by the system prior to an installation of the application code within the system one or more actions required to be performed by the system during the installation of the application code, where the one or more actions include accessing data stored within the system, where the data required to be accessed during the installation of the application code is separate from the application code to be installed within the system;
   identifying, by the system, a developer of the application code; and
   conditionally allowing, by the system, the installation of the application code within the system, based on a comparison of the one or more actions to be performed by the system during the installation of the application and the identified developer of the application code against one or more rules.

\* \* \* \* \*